US010979931B2

(12) United States Patent
Choi et al.

(10) Patent No.: US 10,979,931 B2
(45) Date of Patent: Apr. 13, 2021

(54) METHOD FOR PROVIDING TETHERING SERVICE AND ELECTRONIC DEVICE SUPPORTING THE SAME

(71) Applicant: Samsung Electronics Co., Ltd, Suwon-si (KR)

(72) Inventors: Jongmu Choi, Gunpo-si (KR); Jung-Hun Lee, Suwon-si (KR); Bokun Choi, Seoul (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 15/934,508

(22) Filed: Mar. 23, 2018

(65) Prior Publication Data

US 2018/0279158 A1 Sep. 27, 2018

(30) Foreign Application Priority Data

Mar. 23, 2017 (KR) .................. 10-2017-0037051

(51) Int. Cl.
*H04W 28/02* (2009.01)
*H04W 88/04* (2009.01)
(Continued)

(52) U.S. Cl.
CPC ....... *H04W 28/0236* (2013.01); *H04W 48/16* (2013.01); *H04W 48/20* (2013.01);
(Continued)

(58) Field of Classification Search
CPC combination set(s) only.
See application file for complete search history.

(56) References Cited

U.S. PATENT DOCUMENTS 9,801,120 B2* 10/2017 Ko .................. H04W 4/80
2011/0028085 A1 2/2011 Waung et al.
(Continued)

FOREIGN PATENT DOCUMENTS

| CN | 104378768 A | 2/2015 |
| CN | 104768156 A | 7/2015 |

(Continued)

OTHER PUBLICATIONS

European Patent Office, "European Search Report," Application No. EP 18163128.4, dated Aug. 14, 2018, 7 pages.
(Continued)

*Primary Examiner* — Xavier S Wong

(57) ABSTRACT

An electronic device according to various embodiments of the present disclosure includes one or more antennas, one or more communication circuits electrically connected to at least one of the one or more antennas, a processor electrically connected to the one or more communication circuits or included in the one or more communication circuits, and a memory electrically connected to the processor. The memory can store instructions which, when executed, cause the processor to identify a status of a network connected to the electronic device, to determine a communication scheme corresponding to the network status among a plurality of communication schemes which provide a tethering service, to broadcast a signal which comprises information for identifying the electronic device, using the determined communication scheme, and, based on at least part of a signal received from an external electronic device, to establish a connection with the external electronic device for the tethering service.

14 Claims, 21 Drawing Sheets

(51) Int. Cl.
*H04W 48/16* (2009.01)
*H04W 48/20* (2009.01)
*H04W 52/02* (2009.01)
H04W 48/12 (2009.01)
H04W 76/14 (2018.01)
H04W 84/18 (2009.01)

(52) U.S. Cl.
CPC ....... *H04W 52/0245* (2013.01); *H04W 88/04* (2013.01); *H04W 48/12* (2013.01); *H04W 76/14* (2018.02); *H04W 84/18* (2013.01); *Y02D 30/70* (2020.08)

(56) References Cited

U.S. PATENT DOCUMENTS

| | | | |
|---|---|---|---|
| 2013/0148568 A1* | 6/2013 | Iimori | H04W 40/02 370/315 |
| 2013/0288659 A1* | 10/2013 | Hrabak | H04W 52/0277 455/419 |
| 2013/0295848 A1* | 11/2013 | O'Neill | H04W 68/00 455/41.2 |
| 2013/0331028 A1 | 12/2013 | Kuehnel et al. | |
| 2014/0079961 A1 | 3/2014 | Zhong et al. | |
| 2014/0119252 A1* | 5/2014 | Kella | H04W 52/0216 370/311 |
| 2014/0254499 A1 | 9/2014 | Hassan et al. | |
| 2015/0099505 A1* | 4/2015 | Kiukkonen | H04M 1/7253 455/419 |
| 2015/0341827 A1 | 11/2015 | Bae et al. | |
| 2015/0351004 A1* | 12/2015 | Ko | H04W 48/10 455/411 |
| 2015/0358757 A1* | 12/2015 | Ford | H04W 48/18 455/418 |
| 2015/0358984 A1* | 12/2015 | Uchino | H04W 28/0252 370/329 |
| 2017/0265127 A1* | 9/2017 | Kim | H04W 48/18 |

FOREIGN PATENT DOCUMENTS

| | | |
|---|---|---|
| CN | 105392181 A | 3/2016 |
| JP | 2014063738 A | 4/2014 |
| WO | 2013/037064 A1 | 3/2013 |
| WO | 2015087112 A1 | 6/2015 |
| WO | 2015/127732 A1 | 9/2015 |
| WO | 2017006188 A1 | 1/2017 |

OTHER PUBLICATIONS

European Patent Office Communication Pursuant to Article 94(3) regarding Application No. 18163128.4, dated Feb. 8, 2019, 5 pages.

Communication pursuant to Article 94(3) EPC dated Apr. 28, 2020 in connection with European Patent Application No. 18 163 128.4, 8 pages.

Office Action dated Sep. 18, 2019 in connection with European Patent Application No. 18 163 128.4, 5 pages.

\* cited by examiner

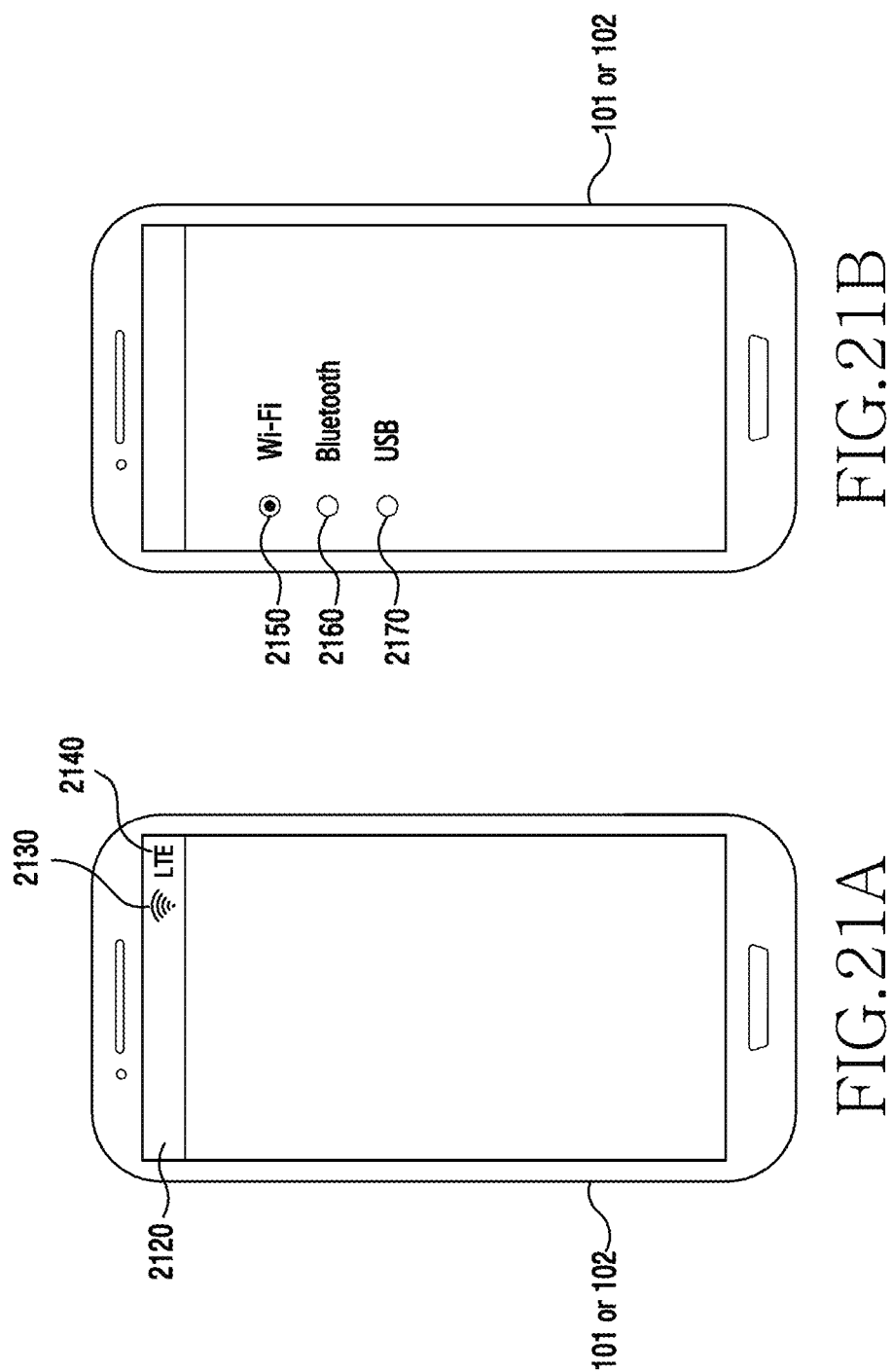

METHOD FOR PROVIDING TETHERING SERVICE AND ELECTRONIC DEVICE SUPPORTING THE SAME

CROSS-REFERENCE TO RELATED APPLICATION AND CLAIM OF PRIORITY

This application is based on and claims priority under 35 U.S.C. § 119 to Korean Patent Application No. 10-2017-0037051 filed on Mar. 23, 2017, in the Korean Intellectual Property Office, the disclosure of which is incorporated by reference herein in its entirety.

TECHNICAL FIELD

The present disclosure relates to a method for providing a tethering service and an electronic device supporting the same.

BACKGROUND

With development in information communication technology and semiconductor technology, a variety of electronic devices are advancing into multimedia devices which provide various multimedia services.

An electronic device can provide a tethering service which enables other electronic device to use a wireless Internet service. Tethering allows the electronic device having Internet connection functionality to provide the Internet connection service to other electronic device which requires Internet connection.

For example, the electronic device which provides the tethering service can serve as an Access Point (AP) in order to provide the tethering service to an external electronic device which receives the tethering service. The external electronic device can access a host device which serves as the AP over a wireless network and thus transmit and receive data for the wireless Internet service.

In a conventional tethering technique, the electronic device provides the tethering service without considering a status of the external network (e.g., backhaul network) connected to the electronic device, and accordingly is subject to problems such as battery consumption, heat, data charge, and resource waste.

SUMMARY

To address the above-discussed deficiencies of the prior art, it is a primary aspect of the present disclosure to provide a method for providing a tethering service using a communication scheme which is adaptively determined based on a status of an external network connected to an electronic device, and the electronic device supporting the same.

According to one aspect of the present disclosure, an electronic device can include one or more antennas, one or more communication circuits electrically connected to at least one of the one or more antennas, a processor electrically connected to the one or more communication circuits or included in the one or more communication circuits, and a memory electrically connected to the processor. The memory can store instructions which, when executed, cause the processor to identify a status of a network connected to the electronic device, to determine a communication scheme corresponding to the network status among a plurality of communication schemes which provide a tethering service, to broadcast a signal which includes information for identifying the electronic device, using the determined communication scheme, and, based on at least part of a signal received from an external electronic device, to establish a connection with the external electronic device for the tethering service.

According to another aspect of the present disclosure, a method of an electronic device for providing a tethering service to an external electronic device can include identifying a status of a network connected to the electronic device, determining a communication scheme corresponding to the network status among a plurality of communication schemes which provide a tethering service, broadcasting a signal which includes information for identifying the electronic device, using the determined communication scheme, and based on at least part of a signal received from the external electronic device, establishing a connection with the external electronic device for the tethering service.

Before undertaking the DETAILED DESCRIPTION below, it may be advantageous to set forth definitions of certain words and phrases used throughout this patent document: the terms "include" and "comprise," as well as derivatives thereof, mean inclusion without limitation; the term "or," is inclusive, meaning and/or; the phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like; and the term "controller" means any device, system or part thereof that controls at least one operation, such a device may be implemented in hardware, firmware or software, or some combination of at least two of the same. It should be noted that the functionality associated with any particular controller may be centralized or distributed, whether locally or remotely.

Moreover, various functions described below can be implemented or supported by one or more computer programs, each of which is formed from computer readable program code and embodied in a computer readable medium. The terms "application" and "program" refer to one or more computer programs, software components, sets of instructions, procedures, functions, objects, classes, instances, related data, or a portion thereof adapted for implementation in a suitable computer readable program code. The phrase "computer readable program code" includes any type of computer code, including source code, object code, and executable code. The phrase "computer readable medium" includes any type of medium capable of being accessed by a computer, such as read only memory (ROM), random access memory (RAM), a hard disk drive, a compact disc (CD), a digital video disc (DVD), or any other type of memory. A "non-transitory" computer readable medium excludes wired, wireless, optical, or other communication links that transport transitory electrical or other signals. A non-transitory computer readable medium includes media where data can be permanently stored and media where data can be stored and later overwritten, such as a rewritable optical disc or an erasable memory device.

Definitions for certain words and phrases are provided throughout this patent document, those of ordinary skill in the art should understand that in many, if not most instances, such definitions apply to prior, as well as future uses of such defined words and phrases.

BRIEF DESCRIPTION OF THE DRAWINGS

For a more complete understanding of the present disclosure and its advantages, reference is now made to the following description taken in conjunction with the accompanying drawings, in which like reference numerals represent like parts:

FIGS. 21A and 21B are diagrams illustrating a method for an electronic device or an external electronic device to change a communication scheme for providing a tethering service, based on a user input according to various embodiments of the present disclosure.

Throughout the drawings, like reference numerals will be understood to refer to like parts, components and structures.

DETAILED DESCRIPTION

Figure 1:
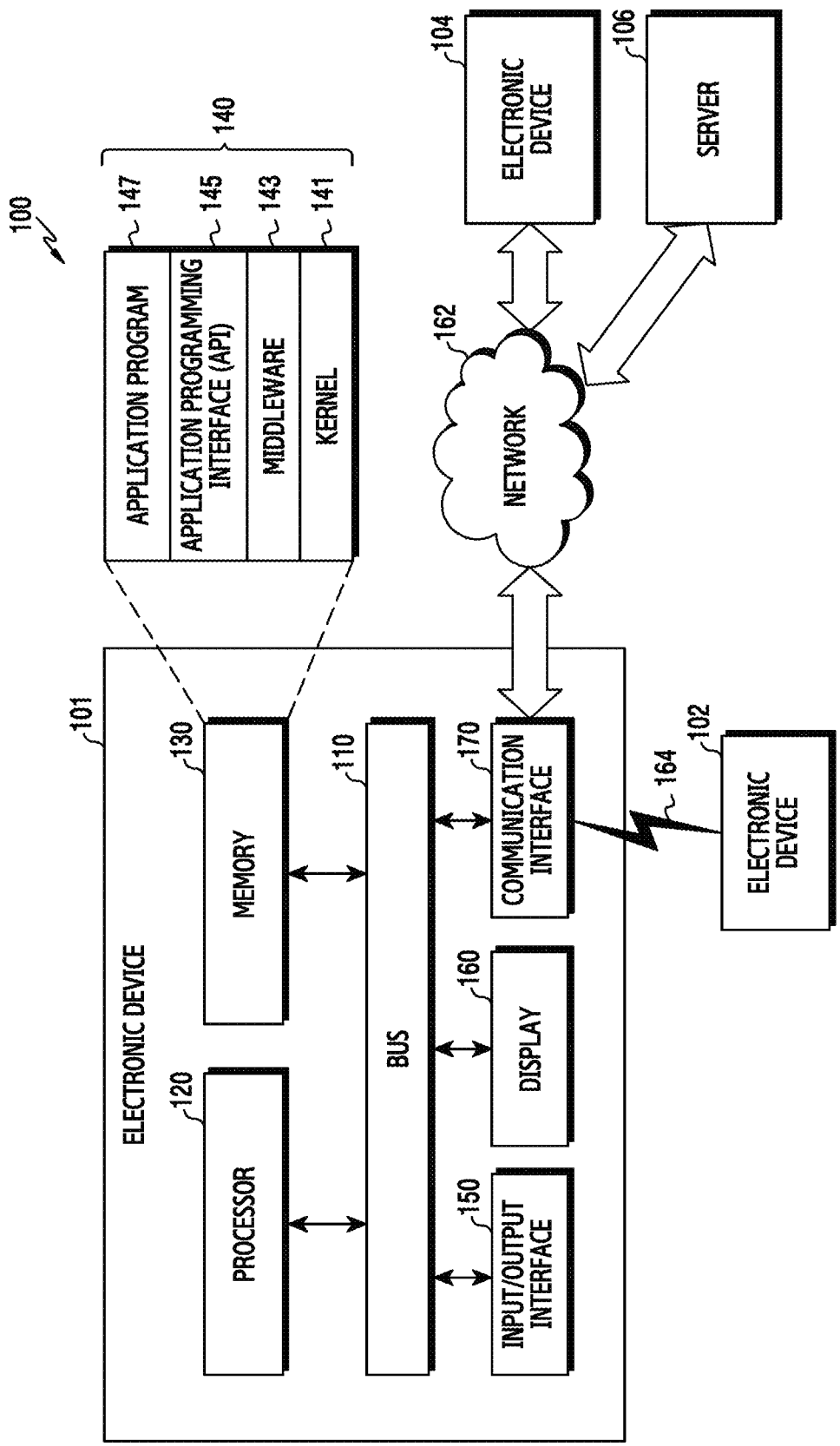
FIG. 1 illustrates a diagram of a network including an electronic device according to various embodiments of the present disclosure.

FIGS. 1 through 21B, discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably arranged system or device.

Hereinafter, various embodiments of the present disclosure will be described with reference to the accompanying drawings. However, it should be understood that there is no intent to limit the present disclosure to the particular forms disclosed herein; rather, the present disclosure should be construed to cover various modifications, equivalents, and/or alternatives of embodiments of the present disclosure. In describing the drawings, similar reference numerals may be used to designate similar constituent elements.

In the present disclosure, the expression "have", "may have", "include" or "may include" refers to existence of a corresponding feature (e.g., numerical value, function, operation, or components such as elements), and does not exclude existence of additional features.

In the present disclosure, the expression "A or B", "at least one of A or/and B", or "one or more of A or/and B" may include all possible combinations of the items listed. For example, the expression "A or B", "at least one of A and B", or "at least one of A or B" refers to all of (1) including at least one A, (2) including at least one B, or (3) including all of at least one A and at least one B.

The expression "a first", "a second", "the first", or "the second" used in various embodiments of the present disclosure may modify various components regardless of the order and/or the importance but does not limit the corresponding components. For example, a first electronic device and a second electronic device may indicate different user devices regardless of order or importance thereof. For example, a first element may be termed a second element, and similarly, a second element may be termed a first element without departing from the scope of the present disclosure.

It should be understood that when an element (e.g., first element) is referred to as being (operatively or communicatively) "connected," or "coupled," to another element (e.g., second element), it may be directly connected or coupled directly to the other element or any other element (e.g., third element) may be interposer between them. In contrast, it may be understood that when an element (e.g., first element) is referred to as being "directly connected," or "directly coupled" to another element (second element), there are no element (e.g., third element) interposed between them.

The expression "configured to" used in the present disclosure may be exchanged with, for example, "suitable for", "having the capacity to", "designed to", "adapted to", "made to", or "capable of" according to the situation. The term "configured to" may not necessarily imply "specifically designed to" in hardware. Alternatively, in some situations, the expression "device configured to" may mean that the device, together with other devices or components, "is able to". For example, the phrase "processor adapted (or configured) to perform A, B, and C" may mean a dedicated processor (e.g. embedded processor) only for performing the corresponding operations or a generic-purpose processor (e.g., central processing unit (CPU) or application processor (AP)) that can perform the corresponding operations by executing one or more software programs stored in a memory device.

The terms used herein are merely for the purpose of describing particular embodiments and are not intended to limit the scope of other embodiments. As used herein, singular forms may include plural forms as well unless the context clearly indicates otherwise. Unless defined otherwise, all terms used herein, including technical and scientific terms, have the same meaning as those commonly understood by a person skilled in the art to which the present disclosure pertains. Such terms as those defined in a generally used dictionary may be interpreted to have the meanings equal to the contextual meanings in the relevant field of art, and are not to be interpreted to have ideal or excessively formal meanings unless clearly defined in the present disclosure. In some cases, even the term defined in the present disclosure should not be interpreted to exclude embodiments of the present disclosure.

An electronic device according to various embodiments of the present disclosure may include at least one of, for example, a smart phone, a tablet Personal Computer (PC), a mobile phone, a video phone, an electronic book reader (e-book reader), a desktop PC, a laptop PC, a netbook computer, a workstation, a server, a Personal Digital Assistant (PDA), a Portable Multimedia Player (PMP), a MPEG-1 audio layer-3 (MP3) player, a mobile medical device, a camera, and a wearable device. According to various embodiments, the wearable device may include at least one of an accessory type (e.g., a watch, a ring, a bracelet, an anklet, a necklace, a glasses, a contact lens, or a Head-Mounted Device (HMD)), a fabric or clothing integrated type (e.g., an electronic clothing), a body-mounted type (e.g., a skin pad, or tattoo), and a bio-implantable type (e.g., an implantable circuit).

According to some embodiments, the electronic device may be a home appliance. The home appliance may, for example, include at least one of a television, a digital video disk (DVD) player, an audio player, a refrigerator, an air conditioner, a cleaner, an oven, a microwave oven, a washing machine, an air purifier, a set-top box, a home automation control panel, a TV box (e.g., HomeSync™ of Samsung, Apple TV™, or Google TV™), a game console (e.g., Xbox™, PlayStation™), an electronic dictionary, an electronic key, a camcorder, and an electronic frame.

According to another embodiment, the electronic device may include at least one of various medical devices (e.g., various portable medical measuring devices (a blood glucose measuring device, a heart rate measuring device, a blood pressure measuring device, a body temperature measuring device, etc.), a Magnetic Resonance Angiography (MRA), a Magnetic Resonance Imaging (MRI), a Computed Tomography (CT) machine, and an ultrasonic machine), a navigation device, a Global Navigation Satellite System (GNSS) receiver, an Event Data Recorder (EDR), a Flight Data Recorder (FDR), a Vehicle Infotainment Devices, an electronic devices for a ship (e.g., a navigation device for a ship, and a gyro-compass), avionics, security devices, an automotive head unit, a robot for home or industry, an automatic teller's machine (ATM) in banks, point of sales (POS) in a shop, or internet device of things (e.g., a light bulb, various sensors, electric or gas meter, a sprinkler device, a fire alarm, a thermostat, a streetlamp, a toaster, a sporting goods, a hot water tank, a heater, a boiler, etc.).

According to some embodiments, the electronic device may include at least one of a part of furniture or a building/structure, an electronic board, an electronic signature-receiving device, a projector, and various kinds of measuring instruments (e.g., a water meter, an electric meter, a gas meter, and a radio wave meter). The electronic device according to various embodiments of the present disclosure may be a combination of one or more of the aforementioned various devices. The electronic device according to some embodiments of the present disclosure may be a flexible device. Further, the electronic device according to an embodiment of the present disclosure is not limited to the aforementioned devices, and may include a new electronic device according to the development of technology.

Hereinafter, an electronic device according to various embodiments will be described with reference to the accompanying drawings. As used herein, the term "user" may indicate a person who uses an electronic device or a device (e.g., an artificial intelligence electronic device) that uses an electronic device.

FIG. 1 is a block diagram 100 illustrating a network environment according to various embodiments. Referring to FIG. 1, an electronic device 101, 102, or 104 or a server 106 may be connected with each other through a network 162 or a short range communication 164. The electronic device 101 may include a bus 110, a processor 120, a memory 130, an input/output interface 150, a display 160, and a communication interface 170. In some embodiments, the electronic device 101 may omit at least one of the above elements or may further include other elements.

The bus 110 may include, for example, a circuit for interconnecting the elements 110 to 170 and transferring communication (e.g., control messages and/or data) between the elements.

The processor 120 may include one or more of a Central Processing Unit (CPU), an Application Processor (AP), and a Communication Processor (CP). The processor 120, for example, may carry out operations or data processing relating to control and/or communication of at least one other element of the electronic device 101.

The memory 130 may include a volatile memory and/or a non-volatile memory. The memory 130 may store, for example, instructions or data relevant to at least one other element of the electronic device 101. According to an embodiment, the memory 130 may store software and/or a program 140. The program 140 may include, for example, a kernel 141, middleware 143, an Application Programming Interface (API) 145, and/or application programs (or "applications") 147. At least some of the kernel 141, the middleware 143, and the API 145 may be referred to as an Operating System (OS).

The kernel 141 may control or manage system resources (e.g., the bus 110, the processor 120, or the memory 130) used for performing an operation or function implemented by the other programs (e.g., the middleware 143, the API 145, or the application programs 147). Furthermore, the kernel 141 may provide an interface through which the middleware 143, the API 145, or the application programs 147 may access the individual elements of the electronic device 101 to control or manage the system resources.

The middleware 143, for example, may function as an intermediary for allowing the API 145 or the application programs 147 to communicate with the kernel 141 to exchange data.

In addition, the middleware 143 may process one or more task requests received from the application programs 147 according to priorities thereof. For example, the middleware 143 may assign priorities for using the system resources (e.g., the bus 110, the processor 120, the memory 130, or the like) of the electronic device 101, to at least one of the application programs 147. For example, the middleware 143 may perform scheduling or loading balancing on the one or more task requests by processing the one or more task requests according to the priorities assigned thereto.

The API 145 is an interface through which the applications 147 control functions provided from the kernel 141 or the middleware 143, and may include, for example, at least one interface or function (e.g., instruction) for file control, window control, image processing, or text control.

The input/output interface 150, for example, may function as an interface that may transfer instructions or data input from a user or another external device to the other element(s) of the electronic device 101. Also, the input/output interface 150 may output, to the user or another external device, commands or data received from the element(s) other than the input/output interface 150 within the electronic device 101.

Examples of the display 160 may include a Liquid Crystal Display (LCD), a Light-Emitting Diode (LED) display, an Organic Light-Emitting Diode (OLED) display, a MicroElectroMechanical Systems (MEMS) display, and an electronic paper display. The display 160, for example, may display various types of contents (for example, text, images, videos, icons, or symbols) for the user. The display 160 may include a touch screen and receive, for example, a touch, gesture, proximity, or hovering input by using an electronic pen or the user's body part.

The communication interface 170, for example, may set communication between the electronic device 101 and an external device (e.g., the first external electronic device 102, the second external electronic device 104, or a server 106). For example, the communication interface 170 may be connected to a network 162 through wireless or wired communication to communicate with the external device (e.g., the second external electronic device 104 or the server 106).

The wireless communication may use at least one of, for example, Long Term Evolution (LTE), LTE-Advance (LTE-A), Code Division Multiple Access (CDMA), Wideband CDMA (WCDMA), Universal Mobile Telecommunications System (UMTS), WiBro (Wireless Broadband), and Global System for Mobile Communications (GSM), as a cellular communication protocol. In addition, the wireless communication may include, for example, short range communication 164. The short-range communication 164 may include at least one of, for example, Wi-Fi, Bluetooth, Near Field Communication (NFC), Magnetic Stripe Transmission (MST), and Global Navigation Satellite System (GNSS).

The MST may generate a pulse according to transmission data using an electromagnetic signal and the pulse may generate a magnetic field signal. The electronic device 101 may transmit the magnetic field signal to a Point Of Sales (POS) device, and the POS device may detect the magnetic field signal using an MST reader and convert the detected magnetic field signal to an electric signal to restore the data.

The GNSS may include at least one of, for example, a Global Positioning System (GPS), a Global navigation satellite system (Glonass), a Beidou navigation satellite system (hereinafter, referred to as "Beidou"), and Galileo (European global satellite-based navigation system). Hereinafter, in the present disclosure, the "GPS" may be interchangeably used with the "GNSS". The wired communication may include, for example, at least one of a Universal Serial Bus (USB), a High Definition Multimedia Interface (HDMI), Recommended Standard 232 (RS-232), and a Plain Old Telephone Service (POTS). The network 162 may include at least one of a communication network such as a computer network (e.g., a LAN or a WAN), the Internet, and a telephone network.

Each of the first and second external electronic devices 102 and 104 may be of a type identical to or different from that of the electronic device 101. According to an embodiment, the server 106 may include a group of one or more servers. According to various embodiments, all or some of the operations performed in the electronic device 101 may be performed in another electronic device or a plurality of electronic devices (e.g., the electronic devices 102 and 104 or the server 106). According to an embodiment, when the electronic device 101 has to perform some functions or services automatically or in response to a request, the electronic device 101 may make a request for performing at least some functions relating thereto to another device (e.g., the electronic device 102 or 104 or the server 106) instead of performing the functions or services by itself or in addition. Another electronic device (e.g., the electronic device 102 or 104) or the server 106 may execute the requested functions or the additional functions, and may deliver a result of the execution to the electronic device 101. The electronic device 101 may process the received result as it is or additionally to provide the requested functions or services. To this end, for example, cloud computing, distributed computing, or client-server computing technology may be used.

Figure 2:
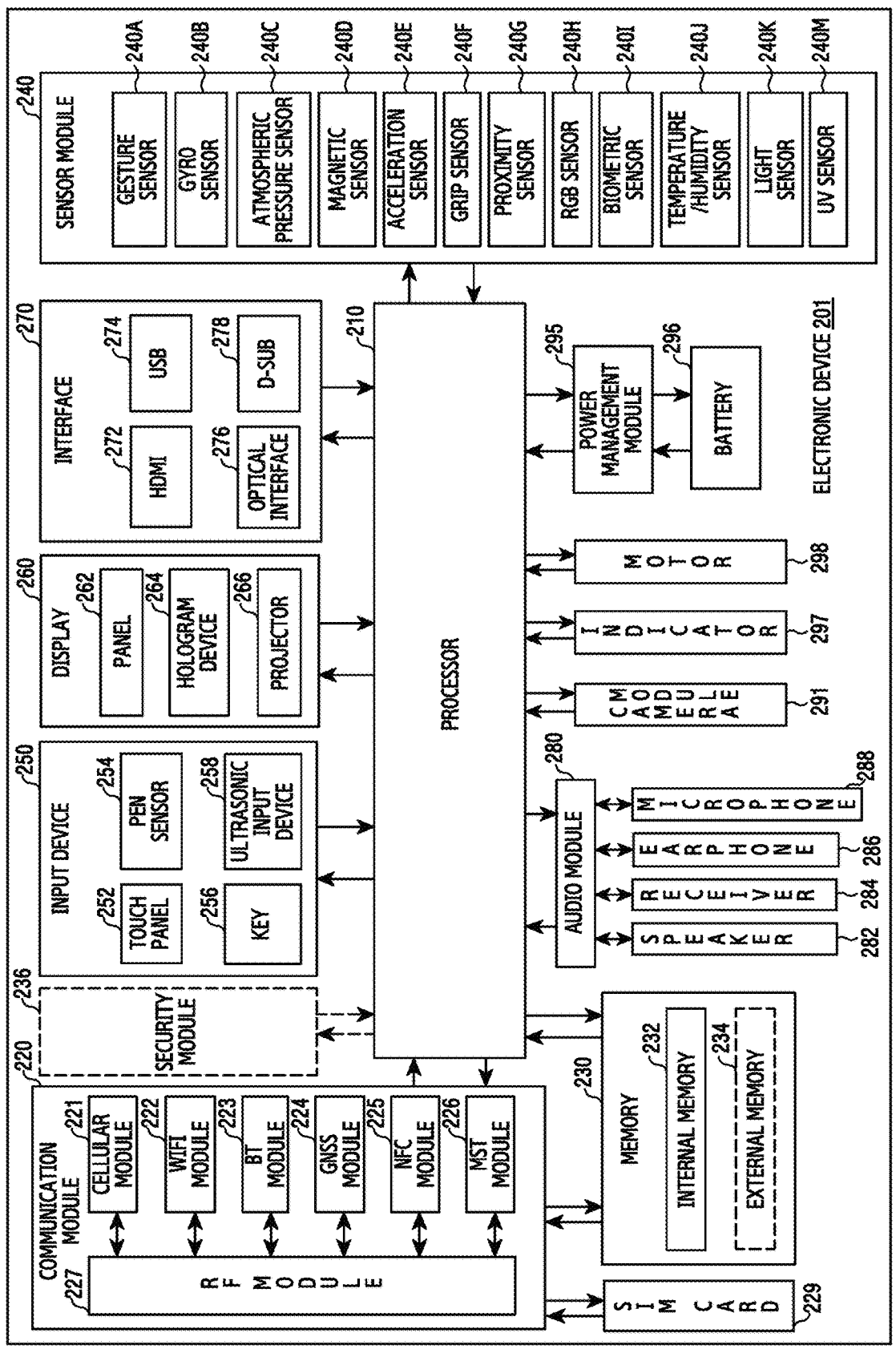
FIG. 2 illustrates a block diagram of an electronic device according to various embodiments of the present disclosure.

FIG. 2 is a block diagram 200 illustrating an electronic device 201 according to various embodiments of the present disclosure. For example, the electronic device 201 may include the whole or part of the electronic device 101 illustrated in FIG. 1. The electronic device 201 may include at least one Application Processor (AP) 210, a communication module 220, a Subscriber Identification Module (SIM) card 229, a memory 230, a sensor module 240, an input device 250, a display 260, an interface 270, an audio module 280, a camera module 291, a power management module 295, a battery 296, an indicator 297, and a motor 298.

The processor 210 may control a plurality of hardware or software components connected to the processor 210 by driving an operating system or an application program and perform processing of various pieces of data and calculations. The processor 210 may be implemented by, for example, a System on Chip (SoC). According to an embodiment, the processor 210 may further include a Graphic Processing Unit (GPU) and/or an image signal processor. The processor 210 may include at least some (e.g., a cellular module 221) of the elements illustrated in FIG. 2. The processor 210 may load, into a volatile memory, instructions or data received from at least one (e.g., a non-volatile memory) of the other elements and may process the loaded instructions or data, and may store various data in a non-volatile memory.

The communication module 220 may have a configuration equal or similar to that of the communication interface 170 of FIG. 1. The communication module 220 may include, for example, a cellular module 221, a Wi-Fi module 222, a BlueTooth module 223, a GNSS module 224 (for example, a GPS module, a Glonass module, a Beidou module, or a Galileo module), an NFC module 225, an MST module 226, and a Radio Frequency (RF) module 227.

The cellular module 221 may provide a voice call, image call, a text message service, or an Internet service through, for example, a communication network. According to an embodiment, the cellular module 221 may distinguish between and authenticate electronic devices 201 within a communication network using a subscriber identification module (for example, the SIM card 229). According to an embodiment of the present disclosure, the cellular module 221 may perform at least some of the functions that the processor 210 may provide. According to an embodiment, the cellular module 221 may include a Communication Processor (CP).

Each of the Wi-Fi module 222, the BT module 223, the GNSS module 224, the NFC module 225 and the MST module 226 may include, for example, a processor for processing data transmitted and received through the relevant module. According to some embodiments of the present disclosure, at least some (e.g., two or more) of the cellular module 221, the Wi-Fi module 222, the BT module 223, the GNSS module 224, the NFC module 225, and the MST module 226 may be included in one Integrated Chip (IC) or IC package.

The RF module 227 may transmit/receive, for example, a communication signal (for example, an RF signal). The RF module 227 may include, for example, a transceiver, a Power Amp Module (PAM), a frequency filter, a Low Noise Amplifier (LNA), or an antenna. According to another embodiment, at least one of the cellular module 221, the Wi-Fi module 222, the Bluetooth module 223, the GNSS module 224, the NFC module 225, and the MST module 226 may transmit and receive RF signals through a separate RF module.

The subscriber identification module 229 may include, for example, a card including a subscriber identity module and/or an embedded SIM, and may contain unique identification information (e.g., an Integrated Circuit Card Identifier (ICCID)) or subscriber information (e.g., an International Mobile Subscriber Identity (IMSI)).

The memory 230 (for example, the memory 130) may include, for example, an internal memory 232 or an external memory 234. The internal memory 232 may include at least one of, for example, a volatile memory (for example, a Dynamic Random Access Memory (DRAM), a Static RAM (SRAM), a Synchronous Dynamic RAM (SDRAM), and the like) and a non-volatile memory (for example, a One Time Programmable Read Only Memory (OTPROM), a Programmable ROM (PROM), an Erasable and Programmable ROM (EPROM), an Electrically Erasable and Programmable ROM (EEPROM), a flash memory (for example, a NAND flash memory or a NOR flash memory), a hard driver, or a Solid State Drive (SSD).

An external memory 234 may further include a flash drive, for example, a Compact Flash (CF), a Secure Digital (SD), a Micro Secure Digital (Micro-SD), a Mini Secure Digital (Mini-SD), an eXtreme Digital (xD), a Mult-Media Card (MMC), a memory stick, or the like. The external memory 234 may be functionally and/or physically connected to the electronic device 201 through various interfaces.

The security module 236 is a module including a storage space having a higher security level than that of the memory 230 and may be a circuit guaranteeing safe data storage and a protected execution environment. For example, an electronic device may encrypt data (e.g., biometric information, personal information, or card information) which requires a high security level, and may store, in the security module 236, a key that is used for encryption. The security module 236 may be implemented by a separate circuit and may include a separate processor. The security module 236 may exist in, for example, a detachable smart chip or Secure Digital (DS) card, or may include an embedded Secure Elements (eSE) embedded in a fixed chip of the electronic device 201. Further, the security module 236 may be operated by an Operating System (OS) that is different from the OS of the electronic device 201. For example, the security module may operate on the basis of a Java Card Open Platform (JCOP) operating system.

The sensor module 240 may measure a physical quantity or detect an operation state of the electronic device 201, and may convert the measured or detected information into an electrical signal. The sensor module 240 may include, for example, at least one of a gesture sensor 240A, a gyro sensor 240B, an atmospheric pressure sensor 240C, a magnetic sensor 240D, an acceleration sensor 240E, a grip sensor 240F, a proximity sensor 240G, a color sensor 240H (for example, a red, green, blue (RGB) sensor), a biometric sensor 240I, a temperature/humidity sensor 240J, a light sensor 240K, and a ultraviolet (UV) sensor 240M. Additionally or alternatively, the sensor module 240 may include, for example, an E-nose sensor, an electromyography (EMG) sensor, an electroencephalogram (EEG) sensor, an electrocardiogram (ECG) sensor, an Infrared (IR) sensor, an iris sensor, and/or a fingerprint sensor. The sensor module 240 may further include a control circuit for controlling one or more sensors included therein. In some embodiments of the present disclosure, an electronic device 201 may further include a processor configured to control the sensor module 240 as a part of or separately from the processor 210, and may control the sensor module 240 while the processor 210 is in a sleep state.

The input device 250 may include, for example, a touch panel 252, a (digital) pen sensor 254, a key 256, or an ultrasonic input device 258. The touch panel 252 may use at least one of, for example, a capacitive scheme, a resistive scheme, an infrared scheme, and an ultrasonic scheme. Also, the touch panel 252 may further include a control circuit. The touch panel 252 may further include a tactile layer and provide a tactile reaction to the user.

The (digital) pen sensor 254 may include, for example, a recognition sheet which is a part of the touch panel or is separated from the touch panel. The key 256 may include, for example, a physical button, an optical key or a keypad. The ultrasonic input device 258 may detect ultrasonic wave generated by an input tool through a microphone (for example, the microphone 288) and identify data corresponding to the detected ultrasonic waves.

The display 260 (for example, the display 160) may include a panel 262, a hologram device 264 or a projector 266. The panel 262 may include a configuration identical or similar to that of the display 160 illustrated in FIG. 1. The panel 262 may be implemented to be, for example, flexible, transparent, or wearable. The panel 262 and the touch panel 252 may be configured by one module. The hologram device 264 may show a three dimensional image in the air by using an interference of light. The projector 266 may display an image by projecting light onto a screen. The screen may be located, for example, inside or outside the electronic device 201. According to an embodiment, the display 260 may further include a control circuit for controlling the panel 262, the hologram device 264, or the projector 266.

The interface 270 may include, for example, a High-Definition Multimedia Interface (HDMI) 272, a Universal Serial Bus (USB) 274, an optical interface 276, or a D-sub-miniature (D-sub) 278. The interface 270 may be included in, for example, the communication interface 170 illustrated in FIG. 1. Additionally or alternatively, the interface 270 may include, for example, a Mobile High-definition Link (MHL) interface, a Secure Digital (SD) card/Multi-Media Card (MMC) interface, or an Infrared Data Association (IrDA) standard interface.

The audio module 280 may bilaterally convert, for example, a sound and an electrical signal. At least some elements of the audio module 280 may be included in, for example, the input/output interface 150 illustrated in FIG. 1. The audio module 280 may process sound information which is input or output through, for example, a speaker 282, a receiver 284, earphones 286, the microphone 288 or the like.

The camera module 291 is a device which may photograph a still image and a dynamic image. According to an embodiment, the camera module 291 may include one or more image sensors (for example, a front sensor or a back sensor), a lens, an Image Signal Processor (ISP) or a flash (for example, LED or xenon lamp).

The power management module 295 may manage, for example, power of the electronic device 201. According to an embodiment, the power management module 295 may include a Power Management Integrated Circuit (PMIC), a charger Integrated Circuit (IC), or a battery or fuel gauge. The PMIC may use a wired and/or wireless charging method. Examples of the wireless charging method may include, for example, a magnetic resonance method, a magnetic induction method, an electromagnetic method, and the like, and may further include additional circuits (e.g., a coil loop, a resonance circuit, a rectifier, etc.) for wireless charging. The battery gauge may measure, for example, a residual quantity of the battery 296, and a voltage, a current, or a temperature during the charging. The battery 296 may include, for example, a rechargeable battery or a solar battery.

The indicator 297 may indicate a particular state (e.g., a booting state, a message state, a charging state, or the like) of the electronic device 201 or a part (e.g., the processor 210) of the electronic device 201. The motor 298 may convert an electrical signal into mechanical vibration, and may generate vibration, a haptic effect, or the like. Although not illustrated, the electronic device 201 may include a processing unit (e.g., a GPU) for supporting a mobile television (TV). The processing unit for supporting mobile TV may, for example, process media data according to a certain standard such as Digital Multimedia Broadcasting (DMB), Digital Video Broadcasting (DVB), or media-FLO™.

Each of the components of the electronic device according to the present disclosure may be implemented by one or more components, and the name of the corresponding component may vary depending on the type of the electronic device. The electronic device according to various embodiments of the present disclosure may include at least one of the aforementioned elements. Some elements may be omitted or other additional elements may be further included in the electronic device. Also, some of the hardware components according to various embodiments may be combined into one entity, which may perform functions identical to those of the relevant components before the combination.

Figure 3:
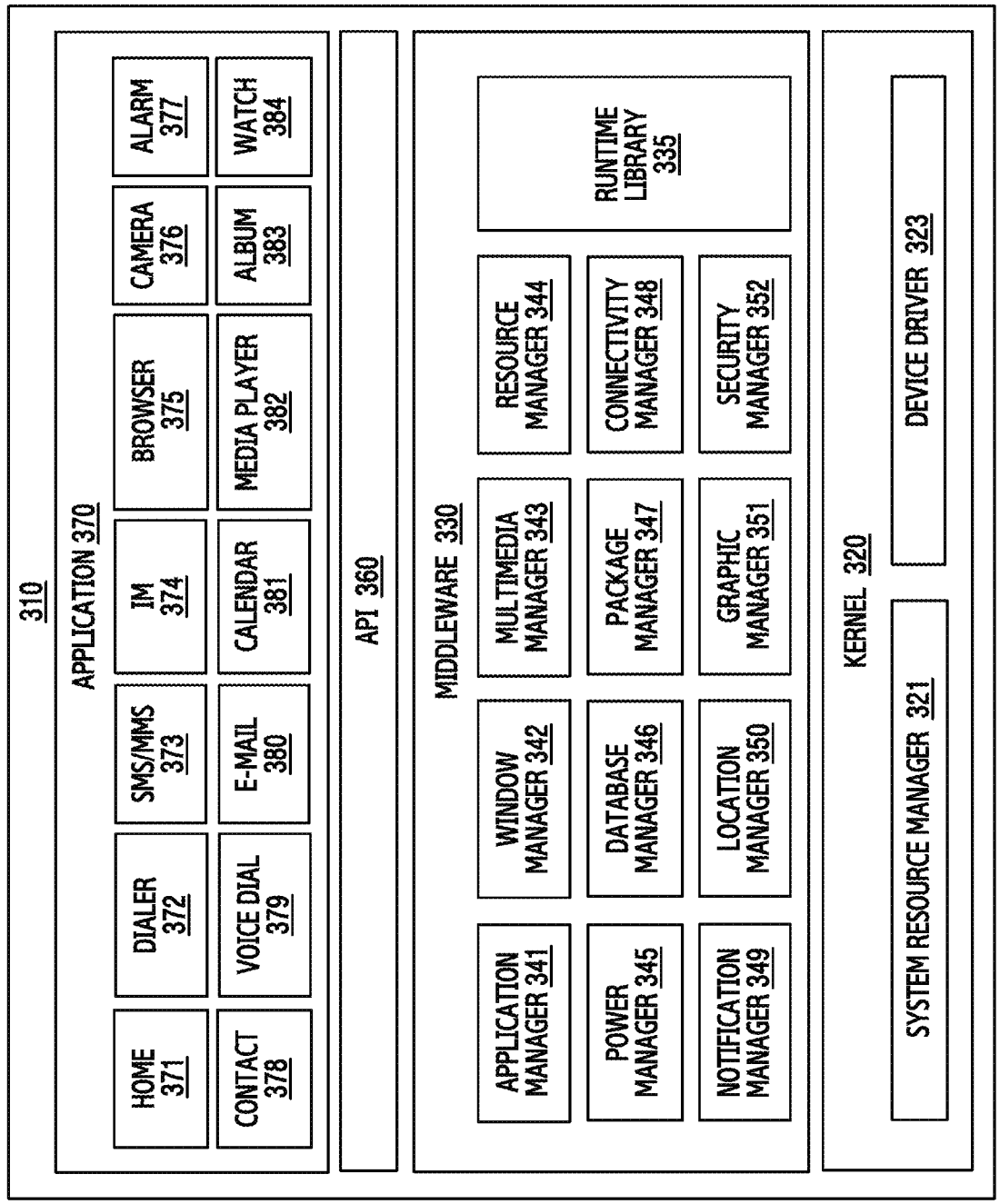
FIG. 3 illustrates a block diagram of a program module according to various embodiments of the present disclosure.

FIG. 3 is a block diagram 300 illustrating a program module 310 according to various embodiments of the present disclosure. According to an embodiment, the program module 310 (for example, the program 140) may include an Operating System (OS) for controlling resources related to the electronic device (for example, the electronic device 101) and/or various applications (for example, the application programs 147) executed in the operating system. The operating system may be, for example, Android, iOS, Windows, Symbian, Tizen, Bada, or the like.

The program module 310 may include a kernel 320, middleware 330, an Application Programming Interface (API) 360, and/or an application 370. At least some of the program module 310 may be preloaded on the electronic device, or may be downloaded from an external electronic device (e.g., the electronic device 102 or 104, or the server 106).

The kernel 320 (for example, the kernel 141) may include, for example, a system resource manager 321 and/or a device driver 323. The system resource manager 321 may perform the control, allocation, retrieval, or the like of system resources. According to an embodiment of the present disclosure, the system resource manager 321 may include a process manager, a memory manager, a file system manager, or the like. The device driver 323 may include, for example, a display driver, a camera driver, a Bluetooth driver, a shared memory driver, a USB driver, a keypad driver, a Wi-Fi driver, an audio driver, or an Inter-Process Communication (IPC) driver.

The middleware 330 may provide a function required by the applications 370 in common or provide various functions to the applications 370 through the API 360 so that the applications 370 can efficiently use limited system resources within the electronic device. According to an embodiment, the middleware 330 (for example, the middleware 143) may include, for example, at least one of a runtime library 335, an application manager 341, a window manager 342, a multimedia manager 343, a resource manager 344, a power manager 345, a database manager 346, a package manager 347, a connectivity manager 348, a notification manager 349, a location manager 350, a graphic manager 351, and a security manager 352.

The runtime library 335 may include a library module which a compiler uses in order to add a new function through a programming language while the applications 370 are being executed. The runtime library 335 may perform input/output management, memory management, the functionality for an arithmetic function, or the like.

The application manager 341 may manage, for example, a life cycle of at least one of the applications 370. The window manager 342 may manage Graphical User Interface (GUI) resources used for the screen. The multimedia manager 343 may determine a format required to reproduce various media files, and may encode or decode a media file by using a coder/decoder (codec) appropriate for the corresponding format. The resource manager 344 may manage resources, such as a source code, a memory, a storage space, and the like of at least one of the applications 370.

The power manager 345 may operate together with a Basic Input/Output System (BIOS) to manage a battery or power, and may provide power information required for the operation of the electronic device. The database manager 346 may generate, search for, and/or change a database to be used by at least one of the applications 370. The package manager 347 may manage the installation or update of an application distributed in the form of a package file.

The connectivity manager 348 may manage a wireless connection such as, for example, Wi-Fi or Bluetooth. The notification manager 349 may display or notify of an event, such as an arrival message, an appointment, a proximity notification, and the like, in such a manner as not to disturb the user. The location manager 350 may manage location information of the electronic device. The graphic manager 351 may manage a graphic effect, which is to be provided to the user, or a user interface related to the graphic effect. The security manager 352 may provide various security functions required for system security, user authentication, and the like. According to an embodiment of the present disclosure, when the electronic device (for example, the electronic device 101) has a telephone call function, the middleware 330 may further include a telephony manager for managing a voice call function or a video call function of the electronic device. The payment manager may relay information for payment from the application 370 to the application 370 or kernel 320. Further, the payment manager may store information related to the payment, which has been received from an external device, in the electronic device 201 or transfer the internally stored information to an external device.

The middleware 330 may include a middleware module that forms a combination of various functions of the above-described elements. The middleware 330 may provide a module specialized for each type of OS in order to provide a differentiated function. Also, the middleware 330 may dynamically delete some of the existing elements, or may add new elements.

The API 360 (e.g., the API 145) is, for example, a set of API programming functions, and may be provided with a different configuration according to an OS. For example, in the case of Android or iOS, one API set may be provided for each platform. In the case of Tizen, two or more API sets may be provided for each platform.

The applications 370 (for example, the application programs 147) may include, for example, one or more applications which can provide functions such as home 371, dialer 372, SMS/MMS 373, Instant Message (IM) 374, browser 375, camera 376, alarm 377, contacts 378, voice dialer 379, email 380, calendar 381, media player 382, album 383, watch 384, health care (for example, measure exercise quantity or blood sugar), or environment information (for example, atmospheric pressure, humidity, or temperature information).

According to an embodiment of the present disclosure, the applications 370 may include an application (hereinafter, referred to as an "information exchange application" for convenience of description) supporting information exchange between the electronic device (e.g., the electronic device 101) and an external electronic device (e.g., the electronic device 102 or 104). The information exchange application may include, for example, a notification relay application for transferring specific information to an external electronic device or a device management application for managing an external electronic device.

For example, the notification relay application may include a function of transferring, to the external electronic device (e.g., the electronic device 102 or 104), notification information generated from other applications of the electronic device 101 (e.g., an SMS/MMS application, an e-mail application, a health management application, or an environmental information application). Further, the notification relay application may receive notification information from, for example, an external electronic device and provide the received notification information to a user.

For example, the device management application may manage (for example, install, delete, or update) at least one function of an external electronic device (for example, the electronic device 104) communicating with the electronic device (for example, a function of turning on/off the external electronic device itself (or some components) or a function of adjusting luminance (or a resolution) of the display), applications operating in the external electronic device, or services provided by the external electronic device (for example, a call service and a message service).

According to an embodiment, the applications 370 may include applications (for example, a health care application of a mobile medical appliance or the like) designated according to attributes of the external electronic device 102 or 104. According to an embodiment of the present disclosure, the application 370 may include an application received from the external electronic device (e.g., the server 106, or the electronic device 102 or 104). According to an embodiment of the present disclosure, the application 370 may include a preloaded application or a third party application which can be downloaded from the server. Names of the elements of the program module 310, according to the above-described embodiments of the present disclosure, may change depending on the type of OS.

According to various embodiments of the present disclosure, at least some of the program module 310 may be implemented in software, firmware, hardware, or a combination of two or more thereof. At least some of the program module 310 may be implemented (e.g., executed) by, for example, the processor (e.g., the processor 210). At least some of the program module 310 may include, for example, a module, a program, a routine, a set of instructions, and/or a process for performing one or more functions.

The term "module" as used herein may, for example, mean a unit including one of hardware, software, and firmware or a combination of two or more of them. The "module" may be interchangeably used with, for example, the term "unit", "logic", "logical block", "component", or "circuit". The "module" may be a minimum unit of an integrated component element or a part thereof. The "module" may be a minimum unit for performing one or more functions or a part thereof. The "module" may be mechanically or electronically implemented. For example, the "module" according to the present disclosure may include at least one of an Application-Specific Integrated Circuit (ASIC) chip, a Field-Programmable Gate Arrays (FPGA), and a programmable-logic device for performing operations which have been known or are to be developed hereinafter.

According to various embodiments, at least some of the devices (for example, modules or functions thereof) or the method (for example, operations) according to the present disclosure may be implemented by a command stored in a computer-readable storage medium in a programming module form. The instruction, when executed by a processor (e.g., the processor 120), may cause the one or more processors to execute the function corresponding to the instruction. The computer-readable storage medium may be, for example, the memory 130.

The computer readable recoding medium may include a hard disk, a floppy disk, magnetic media (e.g., a magnetic tape), optical media (e.g., a Compact Disc Read Only Memory (CD-ROM) and a Digital Versatile Disc (DVD)), magneto-optical media (e.g., a floptical disk), a hardware device (e.g., a Read Only Memory (ROM), a Random Access Memory (RAM), a flash memory), and the like. In addition, the program instructions may include high class language codes, which can be executed in a computer by using an interpreter, as well as machine codes made by a compiler. The aforementioned hardware device may be configured to operate as one or more software modules in order to perform the operation of the present disclosure, and vice versa.

The programming module according to the present disclosure may include one or more of the aforementioned components or may further include other additional components, or some of the aforementioned components may be omitted. Operations executed by a module, a programming module, or other component elements according to various embodiments of the present disclosure may be executed sequentially, in parallel, repeatedly, or in a heuristic manner. Further, some operations may be executed according to another order or may be omitted, or other operations may be added. Various embodiments disclosed herein are provided merely to easily describe technical details of the present disclosure and to help the understanding of the present disclosure, and are not intended to limit the scope of the present disclosure. Accordingly, the scope of the present disclosure should be construed as including all modifications or various other embodiments based on the technical idea of the present disclosure.

An electronic device described hereinafter may be the electronic device 101 of FIG. 1 or the electronic device 201 of FIG. 2. Although the electronic device 101 of FIG. 1 is exemplified as the electronic device for convenience of explanation, the present disclosure is not limited thereto.

An electronic device 101 according to various embodiments of the present disclosure can include one or more antennas, one or more communication circuits (e.g., the communication module 220) electrically connected to at least one of the one or more antennas, a processor 120 electrically connected to the one or more communication circuits or included in the one or more communication circuits, and a memory 130 electrically connected to the processor 120. The memory 130 can store instructions which, when executed, cause the processor 120 to identify a status of a network 162 connected to the electronic device 101, to determine a communication scheme corresponding to the status of the network 162 among a plurality of communication schemes which provide a tethering service, to broadcast a signal which includes information for identifying the electronic device 101, using the determined communication scheme, and to establish a connection with an external electronic device 102 for the tethering service based on at least part of a signal received from the external electronic device.

In various embodiments, the status of the network 162 can include at least one of a communication type between the electronic device 101 and the network 162, and a channel quality or status between the electronic device 101 and the network 162.

In various embodiments, the instructions can cause the processor 120 to determine at least one of a communication type, a communication standard, and an antenna technique between the electronic device 101 and the network 162, corresponding to the network status.

In various embodiments, the instructions can cause the processor 120 to identify a status of the electronic device 101, and to determine a communication type corresponding to the status of the network 162 and the status of the electronic device 101, among the communication schemes which provide the tethering service.

In various embodiments, the status of the electronic device 101 can include at least one of a battery capacity of the electronic device 101, a temperature of the electronic device 101, data charge information, a system load of the electronic device 101, a movement status of the electronic device 101, and a location of the electronic device 101.

In various embodiments, the instructions can cause the processor 120 to receive a signal including information about a communication scheme supported by the external electronic device 102, from the external electronic device 102, to determine a different communication scheme from the determined communication scheme, based on at least part of the supported communication scheme information of the external electronic device 102 and the network status information, and to transmit information of the different communication scheme from the determined communication scheme, to the external electronic device 102.

In various embodiments, the instructions can cause the processor 120 to identify status change of the network 162 connected to the electronic device 101, and to determine a communication scheme corresponding to the changed network status among the communication schemes which provide the tethering service.

In various embodiments, the instructions can cause the processor 120 to identify status change of the electronic device 101, and to determine a communication scheme corresponding to the changed network status and the changed status of the electronic device 101 among the communication schemes which provide the tethering service.

In various embodiments, the instructions can cause the processor 120 to, in response to a signal, which is received from the external electronic device 102, including information indicating that the external electronic device 102 activates a module for using the communication scheme corresponding to the changed network status, transmit to the external electronic device 102 a signal including information for connecting the external electronic device 102 to the electronic device 101 using the communication scheme corresponding to the changed network status.

In various embodiments, the instructions can cause the processor 120 to, based on at least part of a user input, change the network status or to determine a communication scheme for providing the tethering service.

Figure 4:
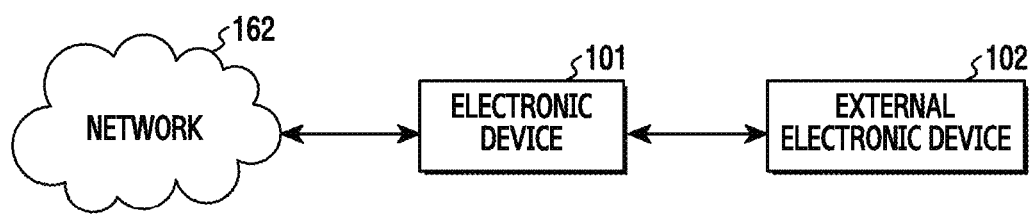
FIG. 4 illustrates a conceptual diagram of a method for providing a tethering service according to various embodiments of the present disclosure.

FIG. 4 illustrates a conceptual diagram of a method for providing a tethering service according to various embodiments of the present disclosure. For example, FIG. 4 depicts a system configuration for providing a tethering service.

Referring to FIG. 4, in an embodiment, an electronic device 101, which provides the tethering service, can be referred to as a tethering device or a host device.

In an embodiment, an external electronic device 102, which receives the tethering service from the electronic device 101, can be referred to as a tethered device or a client device.

In an embodiment, the electronic device 101 can access a network 162 (or a backhaul network 162) using various communication schemes. For example, the electronic device 101 can access the network 162 using a cellular communication scheme (e.g., 3rd Generation (3G) or Long Term Evolution (LTE)). In an embodiment, the network 162 can include a base station (or a router) connected to the electronic device 101, and an upper node of the base station.

In an embodiment, the electronic device 101 can provide the tethering service to the external electronic device 102 using various communication schemes.

For example, the electronic device 101 can provide the tethering service to the external electronic device 102 using a wireless communication scheme such as Bluetooth, WiFi, or Zigbee, or a wired communication scheme such as USB, HDMI, or RS-232.

For example, the electronic device 101 can provide the tethering service to the external electronic device 102 using various communication standards (or versions). For example, the electronic device 101 can provide the tethering service to the external electronic device 102 using WiFi standards (e.g., Institute of Electrical and Electronics Engineers (IEEE) 802.11, IEEE 802.11a, IEEE 802.11b, IEEE 802.11g, IEEE 802.11n, or IEEE 802.11ac) or Bluetooth standard versions (e.g., IEEE 802.12.1.0, IEEE 802.12.1.1, IEEE 802.12.1.2, IEEE 802.12.2.0, IEEE 802.12.2.1, or IEEE 802.12.3.0).

For example, the electronic device 101 can provide the tethering service to the external electronic device 102 using various antenna techniques. For example, the electronic device 101 can provide the tethering service to the external electronic device 102 using the antenna technique such as Single Input Single Output (SISO) or Multiple Input Multiple Output (MIMO).

In an embodiment, a communication path can vary according to the communication scheme. For example, in response to the LTE between the electronic device 101 and the network 162, the electronic device 101 and the network 162 can communicate with each other through a first path (or bearer). In response to the 3G between the electronic device 101 and the network 162, the electronic device 101 and the network 162 can communicate with each other through a second path which is different from the first path. For example, the communication path between the electronic device 101 and the external electronic device 102 can change depending on the communication scheme (e.g., the communication type, the communication standard, or the antenna technique) between the electronic device 101 and the external electronic device 102.

In an embodiment, the electronic device 101 can determine the communication scheme for providing the tethering service, based on status information of the network 162, and establish a connection with the external electronic device 102 using the determined communication scheme.

For example, the electronic device 101 can identify (or detect) at least one of the communication type (e.g., 3G or LTE) between the between the electronic device 101 and the network 162 and a channel quality or status (e.g., signal strength, data rate, etc.) between the electronic device 101 and the network 162. The electronic device 101 can determine the communication scheme for connecting the external electronic device 102 by considering at least one of the communication type between the electronic device 101 and the network 162 among various communication schemes for providing the tethering service, and the signal quality between the electronic device 101 and the network 162, and establish the communication with the external electronic device 102 using the determined communication scheme.

In another embodiment, the electronic device 101 can determine the communication scheme for providing the tethering service, based on at least part of status information of the network 162 or status information of electronic device 101, and establish the communication with the external electronic device 102 using the determined communication scheme. For example, the electronic device 101 can determine the communication scheme for providing the tethering service by considering not only the status information of the network 162 but also the status information (e.g., a battery level or a remaining battery capacity) of electronic device 101, and establish the communication with the external electronic device 102 using the determined communication scheme.

In yet another embodiment, during the tethering service to the external electronic device 102 using a first communication scheme between the electronic device 101 and the external electronic device 102, when the status (or the status of the network 162 and the status of the electronic device 101) of the network 162 changes, the electronic device 101 can change the communication scheme for providing the tethering service from the first communication scheme to a second communication scheme based on the changed status of the network 162.

Figure 5:
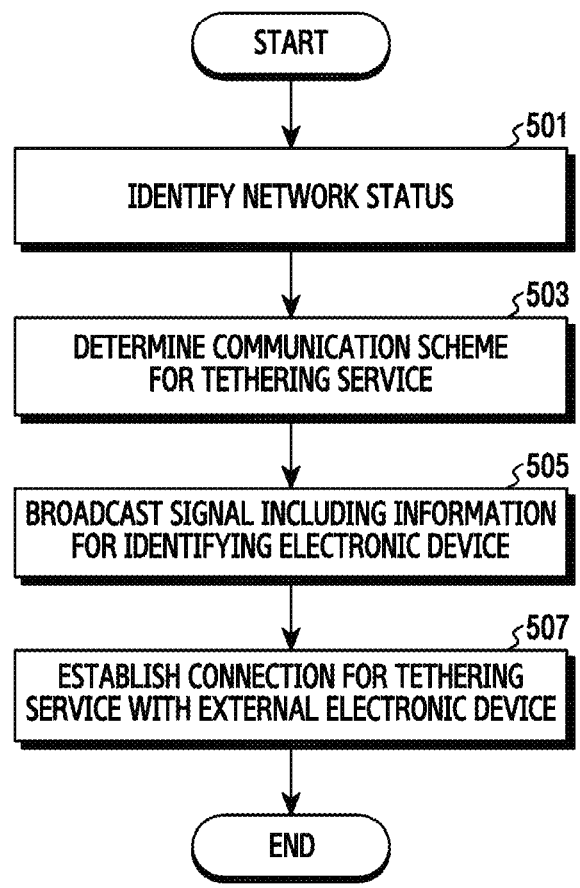
FIG. 5 illustrates a flowchart of a method for an electronic device to establish a connection for a tethering service using a communication scheme which is determined based on a network status according to various embodiments of the present disclosure.

FIG. 5 illustrates a flowchart of a method for an electronic device to establish a connection for a tethering service using a communication scheme which is determined based on a network status according to various embodiments of the present disclosure.

Referring to FIG. 5, in operation 501, the electronic device 101 (e.g., the processor 120) can identify a status of the network 162.

In an embodiment, the electronic device 101 (e.g., the processor 120) can identify a communication type between the electronic device 101 and the network 162. For example, the electronic device 101 can determine whether the communication scheme used to communicate with the network 162 is the LTE or the 3G. Notably, the communication scheme used to communicate with the network 162 is not limited to the LTE or the 3G, and can embrace cellular communication including the LTE or the 3G or wired communication.

In another embodiment, the electronic device 101 (e.g., the processor 120) can identify a quality or a status of a channel between the electronic device 101 and the network 162, using the communication module 220. For example, using the communication module 220, the electronic device 101 can identify, but not limited to, a received signal strength indication, a data rate, a Signal to noise plus Interference plus Noise Ratio (SINR), or a Carrier to Interference plus Noise Ratio (CINR).

In an embodiment, the status of the network 162 is not limited to the above-stated communication type or the quality or the status of the channel between the electronic device 101 and the network 162.

In an embodiment, although not depicted in FIG. 5, before identifying the status of the network 162 in operation 501, the electronic device 101 (e.g., the processor 120) can establish a connection with the network 162 using the communication module 220. For example, the electronic device 101 can establish the connection with the network 162 using the communication module 220 by receiving a user input which selects the communication type between the electronic device 101 and the network 162. For example, the electronic device 101 can receive the user input which selects the LTE or the 3G as the communication scheme for communicating with the network 162. The electronic device 101 can establish the connection with the network 162 using the selected communication scheme in response to the user input which selects the LTE or the 3G. For example, when receiving an input for turning on the electronic device 101 or exchanging signals with the network 162, the electronic device 101 can establish the connection with the network 162 using a default communication scheme.

In an embodiment, although not depicted in FIG. 5, before identifying the status of the network 162 in operation 501, the electronic device 101 can establish the connection with the network 162 and receive the user input for providing the tethering service to the external electronic device 102. For example, the electronic device 101 can receive a user input for using the electronic device 101 as an AP for the tethering service (or for executing a hotspot function).

In operation 503, the electronic device 101 (e.g., the processor 120) can determine a communication scheme corresponding to the status of the network 162 among multiple communication schemes for the tethering service.

In an embodiment, the communication schemes for the tethering service can include various communication schemes supported by the electronic device 101.

In an embodiment, based on at least part of the status of the network 162, the electronic device 101 can determine the communication scheme for providing the tethering service to the external electronic device 102. For example, when the communication scheme between the electronic device 101 and the network 162 is the LTE which can support a higher data rate than the 3G, the electronic device 101 can determine the WiFi supporting a higher data rate than the Bluetooth, as the communication scheme for providing the tethering service to the external electronic device 102.

In another embodiment, based on at least part of the status of the network 162, the electronic device 101 can determine a communication standard for providing the tethering service to the external electronic device 102. For example, when the received signal strength between the electronic device 101 and the network 162 falls below a designated threshold, the electronic device 101 can determine IEEE 802.11a which supports a lower data rate than IEEE 802.11ac of the WiFi but operates with low power, as the communication standard for providing the tethering service to the external electronic device 102.

In yet another embodiment, based on at least part of the status of the network 162, the electronic device 101 can determine the antenna technique for providing the tethering service to the external electronic device 102. For example, when the communication scheme between the electronic device 101 and the network 162 is the LTE which can support a higher data rate than the 3G, the electronic device 101 can determine the MIMO of IEEE 802.11d of the WiFi supporting a higher data rate than the SISO of IEEE 802.11d of the WiFi, as the antenna technique for providing the tethering service to the external electronic device 102.

In the above-mentioned embodiments, the communication types for providing the tethering service to the external electronic device 102 include, but not limited to, the WiFi and the Bluetooth. For example, the communication types for providing the tethering service to the external electronic device 102 can include the wired communication such as USB as well as the wireless communication schemes.

In an embodiment, when the electronic device 101 and the external electronic device 102 are connected using a cable (e.g., USB cable) which supports the wired communication, the electronic device 101 can determine the communication scheme for providing the tethering service to the external electronic device 102, as, but not limited to, the wired communication scheme, regardless of the status of the network 162. For example, even when the electronic device 101 and the external electronic device 102 are connected using the cable (e.g., USB cable) which supports the wired communication, the electronic device 101 can determine WiFi or Bluetooth as the communication scheme for providing the tethering service, according to the status of the network 162 or a user input which selects the communication scheme for the tethering service.

In an embodiment, when determining the communication scheme corresponding to the status of the network 162 among the multiple communication schemes for the tethering service, the electronic device 101 can activate a module for using the determined communication scheme. For example, when determining the Bluetooth as the communication scheme for the tethering service, the electronic device 101 can activate the Bluetooth module 223. In an embodiment, when the module for using the determined communication scheme is already activated, the electronic device 101 can omit activating the module for using the determined communication scheme.

In operation 505, the electronic device 101 (e.g., the processor 120) can broadcast a signal including information for identifying the electronic device 101, using the communication scheme determined in operation 503.

For example, when the electronic device 101 determines the communication scheme for the tethering service, to the WiFi of the IEEE 802.11ac standard using the MIMO, the electronic device 101 can broadcast a beacon frame including the information (e.g., Service Set Identifier (SSID) (or Basic Service Set Identifier (BSSID)) for identifying the electronic device 101, and timestamp, beacon interval, capability, or supported rates, using the WiFi of the IEEE 802.11ac standard using the MIMO. In another embodiment, when the communication scheme of the electronic device 101 for providing the tethering service to the external electronic device 102 is the Bluetooth, the electronic device 101 can broadcast, but not limited to, a signal for inquiry.

In an embodiment, using the communication scheme determined for the tethering service, the electronic device 101 can broadcast a signal including the information for identifying the electronic device 101 and the determined communication scheme information for the tethering service. For example, when the electronic device 101 determines the communication scheme for providing the tethering service to the external electronic device 102, to the WiFi of the IEEE 802.11d standard, the electronic device 101 can broadcast, but not limited to, a signal including the SSID and IEEE 802.11d communication standard information (e.g., information for the communication between the electronic device 101 and the external electronic device 102 using the IEEE 802.11d standard) or information indicating (or notifying) that the determined communication scheme for the tethering service is the IEEE 802.11d, using the WiFi of the IEEE 802.11d standard.

In operation 507, the electronic device 101 (e.g., the processor 120) can establish a connection for the tethering service with the external electronic device 102, based on at least part of a signal received from the external electronic device 102.

In an embodiment, the electronic device 101 can receive a signal requesting authentication (or authentication information) for the communication establishment, from the external electronic device 102 which receives the broadcast signal in operation 505. In response to the signal requesting the authentication received from the external electronic device 102, the electronic device 101 can transmit information authentication information to the external electronic device 102.

In an embodiment, after transmitting the authentication information to the external electronic device 102, the electronic device 101 can receive a signal requesting association. The electronic device 101 can transmit a signal responding to the association request signal received from the external electronic device 102, to the external electronic device 102, and thus establish the connection for the tethering service with the external electronic device 102.

Although not depicted in FIG. 5, after establishing the connection for the tethering service between the electronic device 101 and the external electronic device 102, the electronic device 101 can provide the tethering service to the external electronic device 102 using the communication scheme determined in operation 503.

Figure 6:
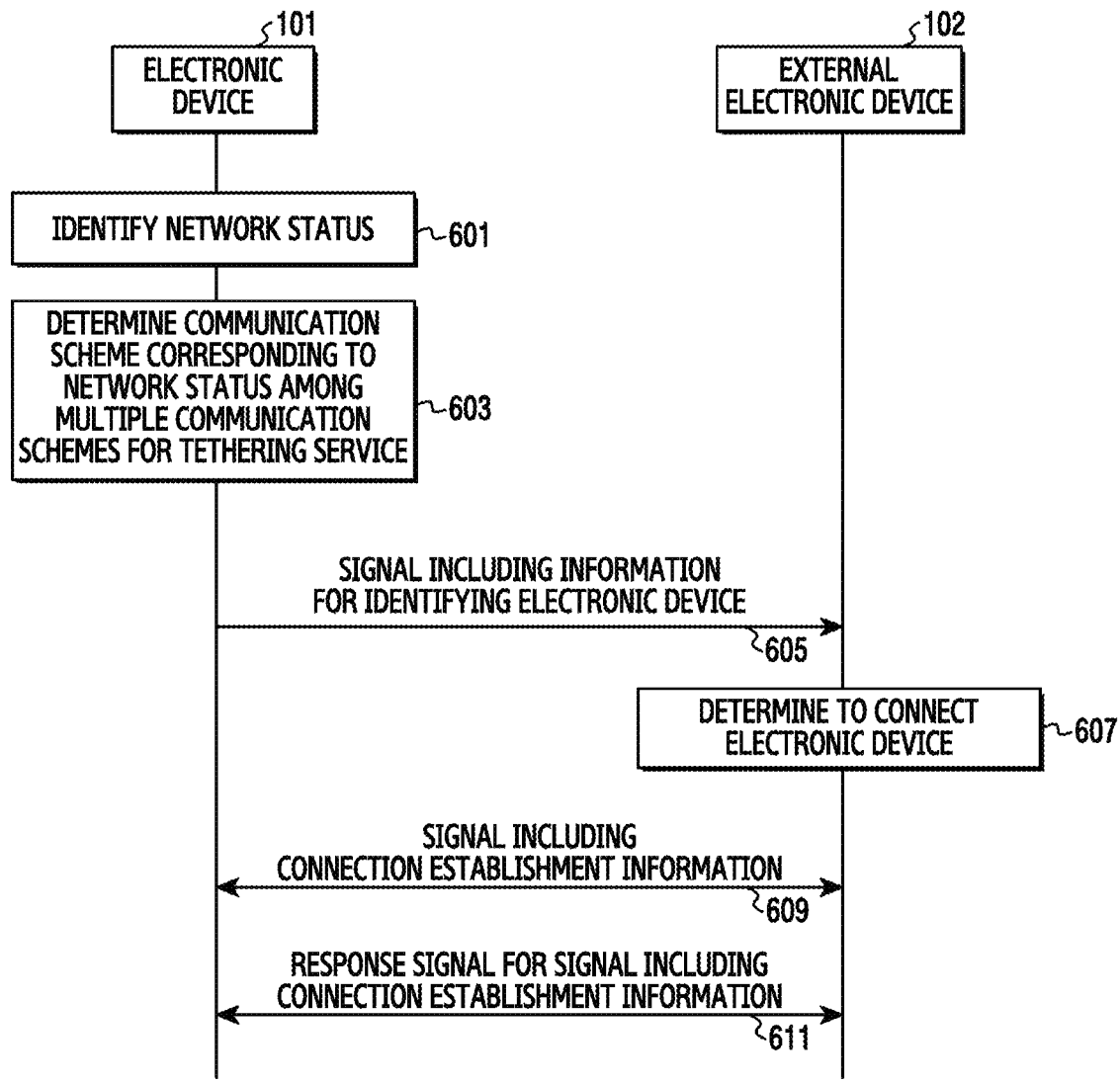
FIG. 6 illustrates a diagram of a system for establishing a connection for a tethering service using a communication scheme determined based on a network status according to various embodiments of the present disclosure.

FIG. 6 illustrates a diagram of a system for establishing a connection for a tethering service using a communication scheme determined based on a network status according to various embodiments of the present disclosure.

Referring to FIG. 6, in operation 601, the electronic device 101 can identify a status of the network 162. For example, the electronic device 101 can identify a type of the communication scheme which is used to communicate with the network 162 connected to the electronic device 101, or a quality or a status of a channel between the electronic device 101 and the network 162.

In operation 603, the electronic device 101 can determine a communication scheme which corresponds to the status of the network 162 and provides the tethering service, among multiple communication schemes for the tethering service. For example, based on at least part of the status of the network 162, the electronic device 101 can determine at least one of the communication type, the communication standard, or the antenna technique, for providing the tethering service to the external electronic device 102.

In operation 605, the electronic device 101 can broadcast a signal including information for identifying the electronic device 101, using the communication scheme determined in operation 603. For example, when the determined communication scheme is the WiFi, the electronic device 101 can broadcast the signal including SSID. When the determined communication scheme is the Bluetooth, the electronic device 101 can broadcast the signal including Bluetooth Device (BD) address.

In an embodiment, using the determined communication scheme for the tethering service, the electronic device 101 can broadcast a signal including the information for identifying the electronic device 101 and information about the determined communication scheme for the tethering service.

In operation 607, the external electronic device 102 can receive the broadcast signal from the electronic device 101 and determine to connect to the electronic device 101.

In an embodiment, the external electronic device 102 can detect (or scan, or discover, or search) the broadcast signal of the electronic device 101.

In an embodiment, based on at least part of the detected signal, the external electronic device 102 can output information about the electronic device 101 which broadcasts the signal and other neighboring devices to which the signal is broadcast. For example, the external electronic device 102 can display, but not limited to, a list of SSIDs of the electronic device 101 which broadcasts the signal and the neighboring devices.

In an embodiment, based on at least part of a user input which selects the electronic device 101 in the output information about the electronic device 101 and the neighboring devices, the external electronic device 102 can determine, but not limited to, the electronic device 101 as a device for its connection. For example, according to setting of the external electronic device 102, the external electronic device 102 may determine the electronic device 101 which is connected most recently, as the device for its connection. For example, the external electronic device 102 can access the electronic device 101 based on an input which activates the tethering service function.

In operation 609, the external electronic device 102 can transmit a signal including connection establishment information to the electronic device 101.

In operation 611, the electronic device 101 can transmit a response signal of the signal including the connection establishment information, to the external electronic device 102.

In operations 609 and 611, for example, the external electronic device 102 can transmit a signal requesting authentication, to the electronic device 101, receive a response signal of the authentication request signal from the electronic device 101, and then transmit an association request signal to the electronic device 101. The electronic device 101 can send a response signal of the authentication request signal to the external electronic device 102, and then send a response signal of the association request signal which is received from the external electronic device 102, to the external electronic device 102.

Figure 7:
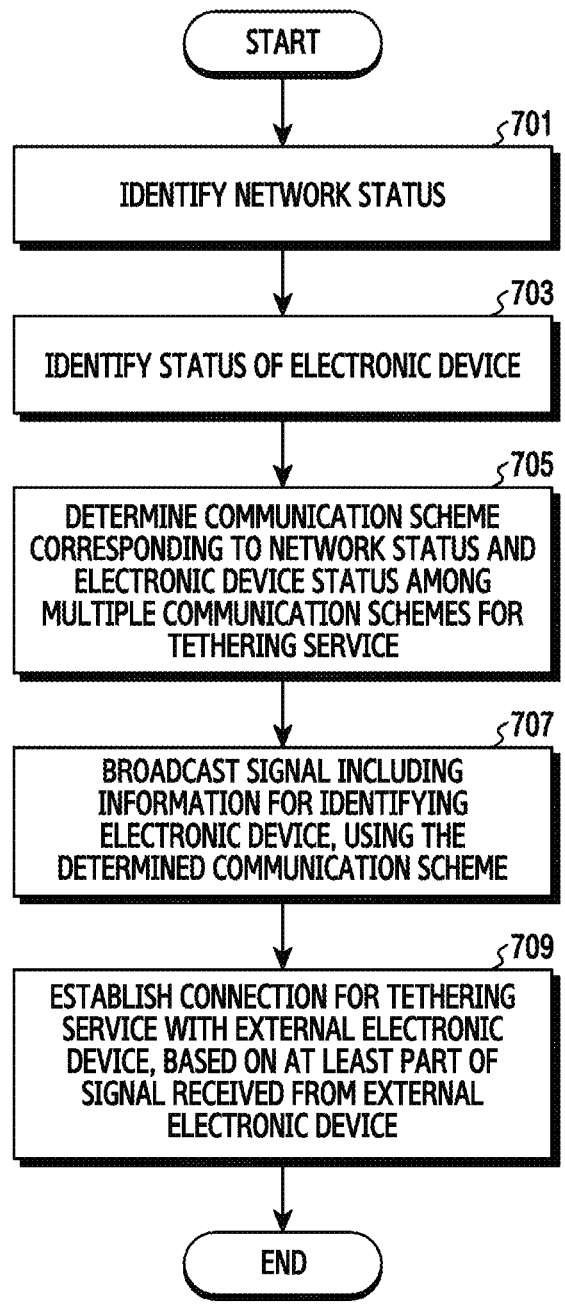
FIG. 7 illustrates a flowchart of a method for an electronic device to establish a connection for a tethering service using a communication scheme which is determined based on a network status and a status of the electronic device according to various embodiments of the present disclosure.

FIG. 7 illustrates a flowchart of a method for an electronic device to establish a connection for a tethering service using a communication scheme determined based on a network status and a status of the electronic device according to various embodiments of the present disclosure.

Referring to FIG. 7, in operation 701, the electronic device 101 (e.g., the processor 120) can identify a status of the network 162.

Operation 701 where the electronic device 101 identifies the status of the network 162 is the same as or similar to, in at least part, operation 501 of FIG. 5 and shall not be further explained.

In operation 703, the electronic device 101 (e.g., the processor 120) can identify its status.

In an embodiment, the electronic device 101 can identify information about its battery capacity (or battery level, or remaining battery capacity). For example, the electronic device 101 can receive information about a current battery capacity from a battery gauge.

In another embodiment, the electronic device 101 can identify its temperature (or humidity). For example, the electronic device 101 can identify its temperature (or humidity) by use of its temperature/humidity sensor 240J.

In yet another embodiment, the electronic device 101 can identify data charge information. For example, the electronic device 101 can identify communication charge information in using the network 162. For example, the electronic device 101 can identify information about free data usage provided from a telecommunications carrier to which a user of the electronic device 101 is subscribed, through the memory 130 or a carrier server (not shown).

In yet another embodiment, the electronic device 101 can identify its system load (or system resource usage) information.

In still another embodiment, the electronic device 101 can identify its movement status information. For example, when the electronic device 101 is moving, the electronic device 101 can identify its movement speed information using the acceleration sensor 240E.

In a further embodiment, the electronic device 101 can identify its current location information. For example, the electronic device 101 can identify information about a distance from a base station connected to the electronic device 101 (or information about whether the electronic device 101 is close to the base station or whether the electronic device 101 is on a boundary of base station coverage).

In various embodiments, the status of the electronic device 101 is not limited to those examples.

In FIG. 7, operation 703 where the electronic device 101 identifies its status is performed, but not limited to, after operation 701. For example, the electronic device 101 may identify its status before the electronic device 101 identifies the status of the network 162 in operation 701. For example, operation 703 where the electronic device 101 identifies its status may be performed, but not limited to, after the user input for providing the tethering service to the external electronic device 102 is received.

In operation 705, the electronic device 101 (e.g., the processor 120) can determine a communication scheme corresponding to at least part of the status of the network 162 or the status of the electronic device 101, among multiple communication schemes for the tethering service. For example, based on at least part of the status of the network 162 or the status of the electronic device 101, the electronic device 101 can determine at least one of a communication type, a communication standard, and an antenna technique, for providing the tethering service.

For example, when the battery capacity falls below a designated value (or a designated level), the electronic device 101 can determine the Bluetooth which supports a lower data rate than the WiFi but consumes less battery, as the communication scheme for providing the tethering service to the external electronic device 102.

For example, when the temperature of the electronic device 101 exceeds a designated threshold temperature, the electronic device 101 can determine the Bluetooth which produces less heat than the WiFi, as the communication scheme for providing the tethering service to the external electronic device 102.

For example, when the free data provided from the telecommunications carrier of the user of the electronic device 101 expires, the electronic device 101 can determine the Bluetooth which requires less data usage than the WiFi, as the communication scheme for providing the tethering service to the external electronic device 102.

For example, when the system load (or system resource usage) of the electronic device 101 exceeds a designated threshold, the electronic device 101 can determine the Bluetooth which drives with less system load than the WiFi, as the communication scheme for providing the tethering service to the external electronic device 102.

For example, when the movement speed of the electronic device 101 exceeds a designated speed, the electronic device 101 can determine the Bluetooth which supports the lower data rate than the WiFi, as the communication scheme for providing the tethering service to the external electronic device 102, because data packets transferred between the electronic device 101 and the network 162 can be lost considerably and the channel status between the electronic device 101 and the network 162 may not be good compared to the movement speed below the designated speed.

For example, when the electronic device 101 is positioned at the boundary of the coverage of the base station connected to the electronic device 101 (or positioned out of a designated distance from the base station), the electronic device 101 can determine the Bluetooth which supports the lower data rate than the WiFi, as the communication scheme for providing the tethering service to the external electronic device 102.

Notably, the status of the electronic device 101 considered when determining the communication scheme between the electronic device 101 and the external electronic device 102 is not limited to those examples.

In an embodiment, the electronic device 101 can determine the communication scheme for providing the tethering service to the external electronic device 102 by collectively (or comprehensively) considering the status of the network 162 and the status of the electronic device 101. For example, the electronic device 101 can weight, but not limited to, the type of the network 162 and the channel quality or status, which are included in the status of the network 162, and the battery capacity of the electronic device 101, the temperature of the electronic device 101, the data charge information, the system load of the electronic device 101, the movement status of the electronic device 101, or the location of the electronic device 101, which are included in the status of the electronic device 101, and determine the communication scheme corresponding to a sum based on the weight, as the communication scheme for providing the tethering service to the external electronic device 102.

In operation 707, the electronic device 101 (e.g., the processor 120) can broadcast a signal including information for identifying the electronic device 101, using the communication scheme determined in operation 705.

In operation 709, the electronic device 101 (e.g., the processor 120) can establish a connection for the tethering service with the external electronic device 102 using the communication module 220, based on at least part of a signal received from the external electronic device 102.

Operation 707 where the electronic device 101 broadcasts the signal including information for identifying the electronic device 101 and operation 709 where the connection for the tethering service is established with the external electronic device 102 are, in at least part, the same or similar to operation 505 and operation 507 of FIG. 5, and thus shall not be further described.

Figure 8:
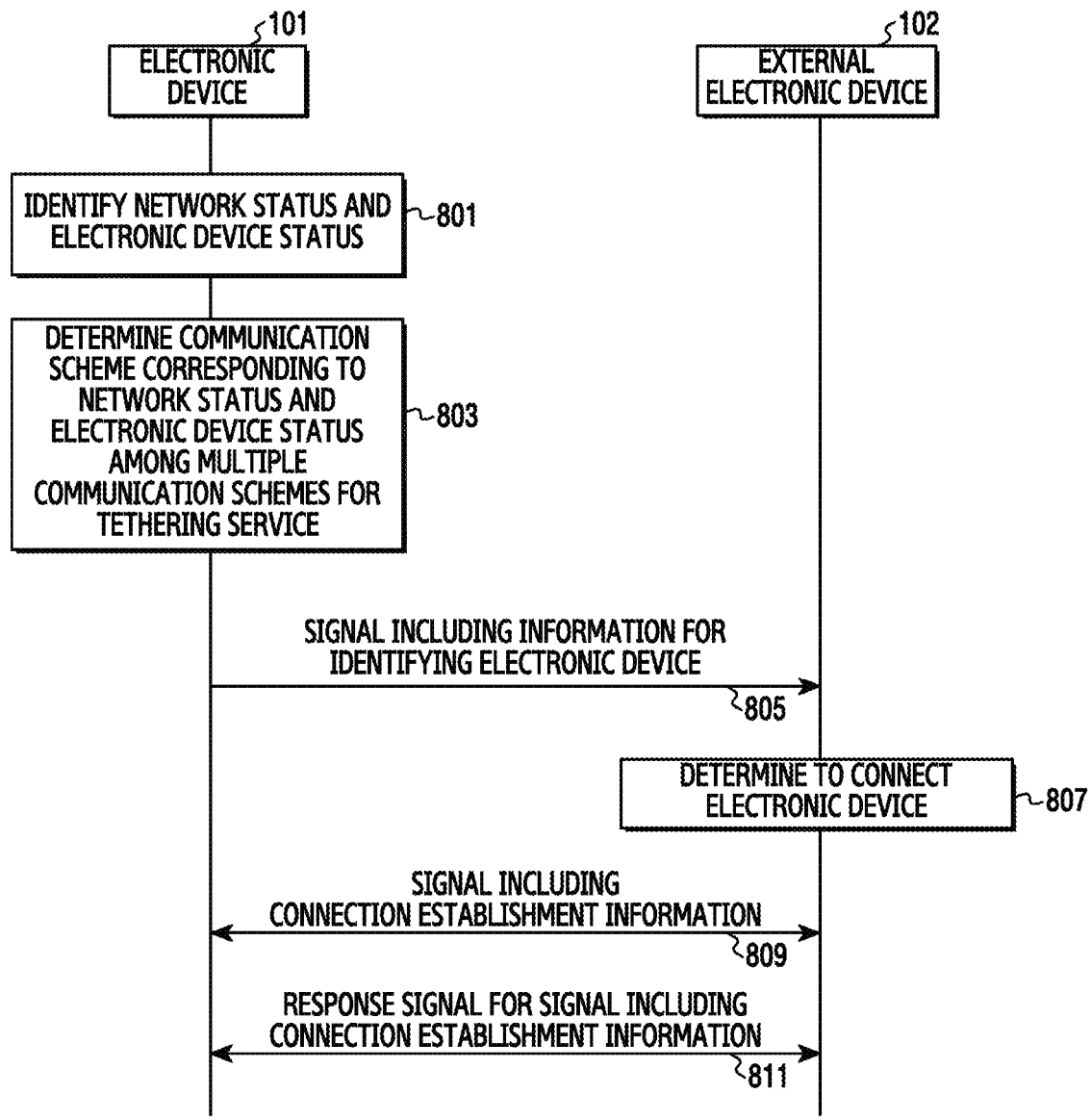
FIG. 8 illustrates a diagram of a system for establishing a connection for a tethering service using a communication scheme determined based on a network status and a status of an electronic device according to various embodiments of the present disclosure.

FIG. 8 illustrates a diagram of a system for establishing a connection for a tethering service using a communication scheme determined based on a network status and a status of an electronic device 101 according to various embodiments of the present disclosure.

In operation 801, the electronic device 101 can identify a status of the network 162 and the status of the electronic device 101. For example, the electronic device 101 can identify, as the status of the network 162, the communication type used to communicate with the network 162 connected to the electronic device 101, and the channel quality or status between the electronic device 101 and the network 162, and identify, as the status of the electronic device 101, the battery capacity of the electronic device 101, the temperature of the electronic device 101, the data charge information, the system load of the electronic device 101, the movement status of the electronic device 101, or the location of the electronic device 101.

In operation 803, the electronic device 101 can determine a communication scheme corresponding to at least one of the status of the network 162 and the status of the electronic device 101, among multiple communication schemes for the tethering service. For example, based on at least part of the status of the network 162, the electronic device 101 can determine at least one of a communication type, a communication standard, and an antenna technique, for the tethering service.

In operation 805, the electronic device 101 can broadcast a signal including information for identifying the electronic device 101, using the communication scheme determined in operation 803.

In operation 807, the external electronic device 102 can receive the broadcast signal from the electronic device 101 and determine whether to connect the electronic device 101.

In operation 809, the external electronic device 102 can transmit a signal including connection establishment information, to the electronic device 101 using the communication module 220.

In operation 811, the electronic device 101 can transmit a response signal of the signal including the connection establishment information, to the external electronic device 102 using the communication module 220.

In various embodiments, operations 805 through 811 of FIG. 8 are, in at least part, the same as or similar to operations 605 through 611 of FIG. 6 and thus their detailed explanations shall be omitted.

Figure 9:
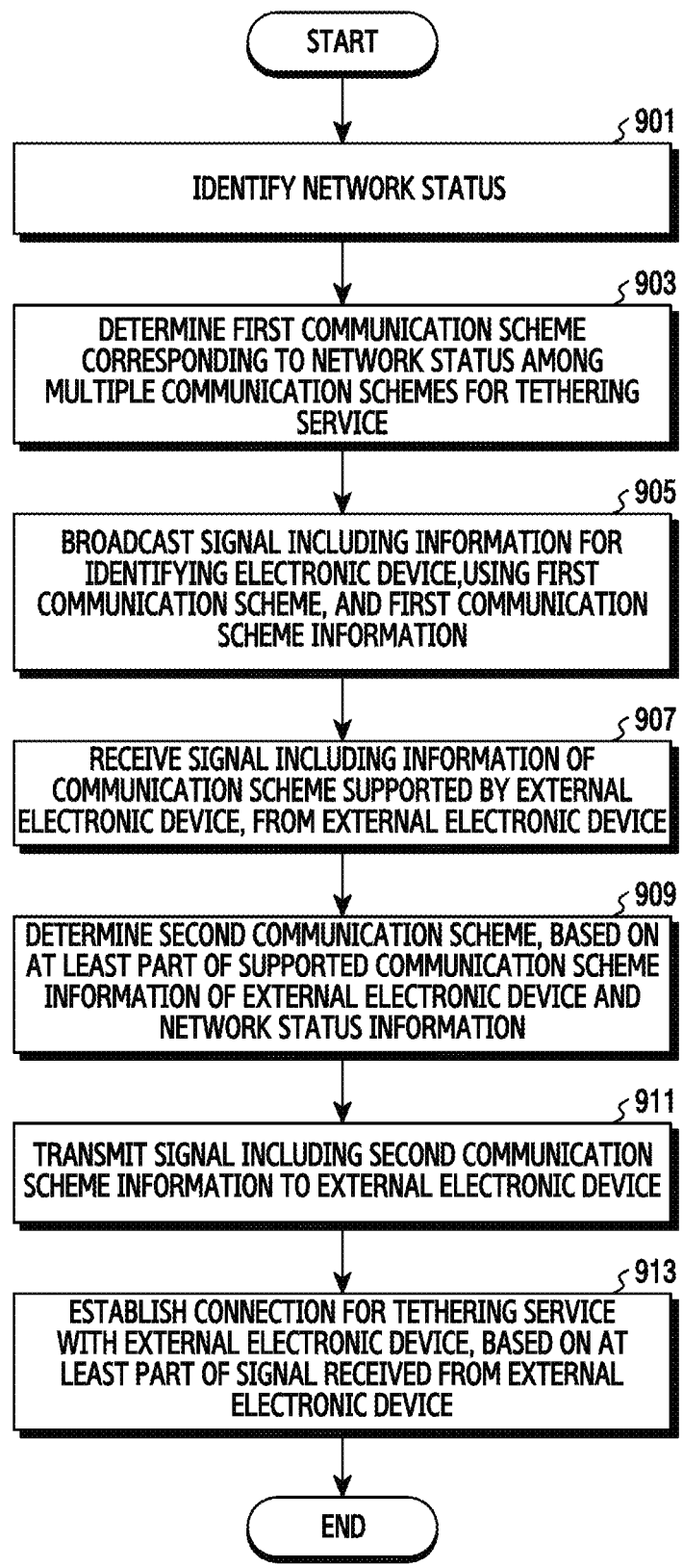
FIG. 9 illustrates a flowchart of a method for an electronic device to establish a connection for a tethering service using a communication scheme which is determined based on a network status according to various embodiments of the present disclosure.

FIG. 9 illustrates a flowchart of a method for an electronic device to establish a connection for a tethering service using a communication scheme determined based on a network status according to various embodiments of the present disclosure.

In various embodiments, FIG. 9 can correspond to an embodiment when the external electronic device 102 which receives the tethering service does not support the communication scheme (e.g., the communication standard) determined by the electronic device 101 for the tethering service.

In operation 901, the electronic device 101 (e.g., the processor 120) can identify a status of the network 162. In an embodiment, the electronic device 101 can identify the status of the network 162 and a status of the electronic device 101. In an embodiment, operation 901 is the same as or similar to, in at least part, operation 501 and thus its detailed explanations shall be omitted.

In operation 903, the electronic device 101 (e.g., the processor 120) can determine a first communication scheme corresponding to the status of the network 162 among multiple communication schemes for the tethering service. For example, the electronic device 101 can determine, but not limited to, the IEEE 802.11ac standard of the WiFi, as the first communication scheme for providing the tethering service to the external electronic device 102. In an embodiment, the electronic device 101 can determine the first communication scheme corresponding to at least one of the status of the network 162 and the status of the electronic device 101.

In operation 905, the electronic device 101 (e.g., the processor 120) can broadcast a signal including information (e.g., SSID) for identifying the electronic device 101 and first communication scheme information, using the first communication scheme determined in operation 903.

For example, when the electronic device 101 determines the communication scheme for providing the tethering service to the external electronic device 102, to the WiFi of the IEEE 802.11ac standard, the electronic device 101 can broadcast a signal including the SSID and IEEE 802.11ac standard information (e.g., information for the communication establishment between the electronic device 101 and the external electronic device 102 using the IEEE 802.11ac standard) or information indicating (or notifying) that the communication scheme determined for the tethering service is the IEEE 802.11ac, using the WiFi of the IEEE 802.11ac standard.

In operation 907, the electronic device 101 (e.g., the processor 120) can receive a signal including information of a communication scheme supported by the external electronic device 102, from the external electronic device 102. For example, when the external electronic device 102 receiving the broadcast signal including the communication scheme information of the IEEE 802.11ac standard from the electronic device 101 does not support the first communication scheme (e.g., the IEEE 802.11ac standard of the WiFi) but supports a communication scheme (e.g., the IEEE 802.11a standard of the WiFi) having a maximum data rate lower than a maximum data rate of the first communication scheme, the external electronic device 102 can determine that it does not support the first communication scheme. The external electronic device 102 can identify its supporting communication scheme, for example, determine that the electronic device 101 supports the communication scheme (or communication scheme information) of the maximum data rate lower than the maximum data rate of the first communication scheme. The external electronic device 102 can transmit a signal including its supported communication scheme information to the electronic device 101.

In operation 909, the electronic device 101 (e.g., the processor 120) can determine a second communication scheme, based on at least part of the supported communication scheme information of the external electronic device 102 and the status information of the network 162.

For example, based on the communication scheme supporting the maximum data rate lower than the maximum data rate of the first communication scheme, which is received from the external electronic device 102, and the status of the network 162, the electronic device 101 can determine, for example, the supported communication scheme (e.g., IEEE 802.11a standard of the WiFi) of the external electronic device 102, as the second communication scheme.

In operation 911, using the second communication scheme determined, the electronic device 101 (e.g., the processor 120) can transmit a signal including second communication scheme information, for example, information for establishing communication using the second communication scheme, to the external electronic device 102.

In operation 913, the electronic device 101 (e.g., the processor 120) can establish a connection for the tethering service with the external electronic device 102, based on at least part of a signal received from the external electronic device 102. For example, the electronic device 101 can perform authentication and association for communicating with the external electronic device 102 using the second communication scheme.

Figure 10:
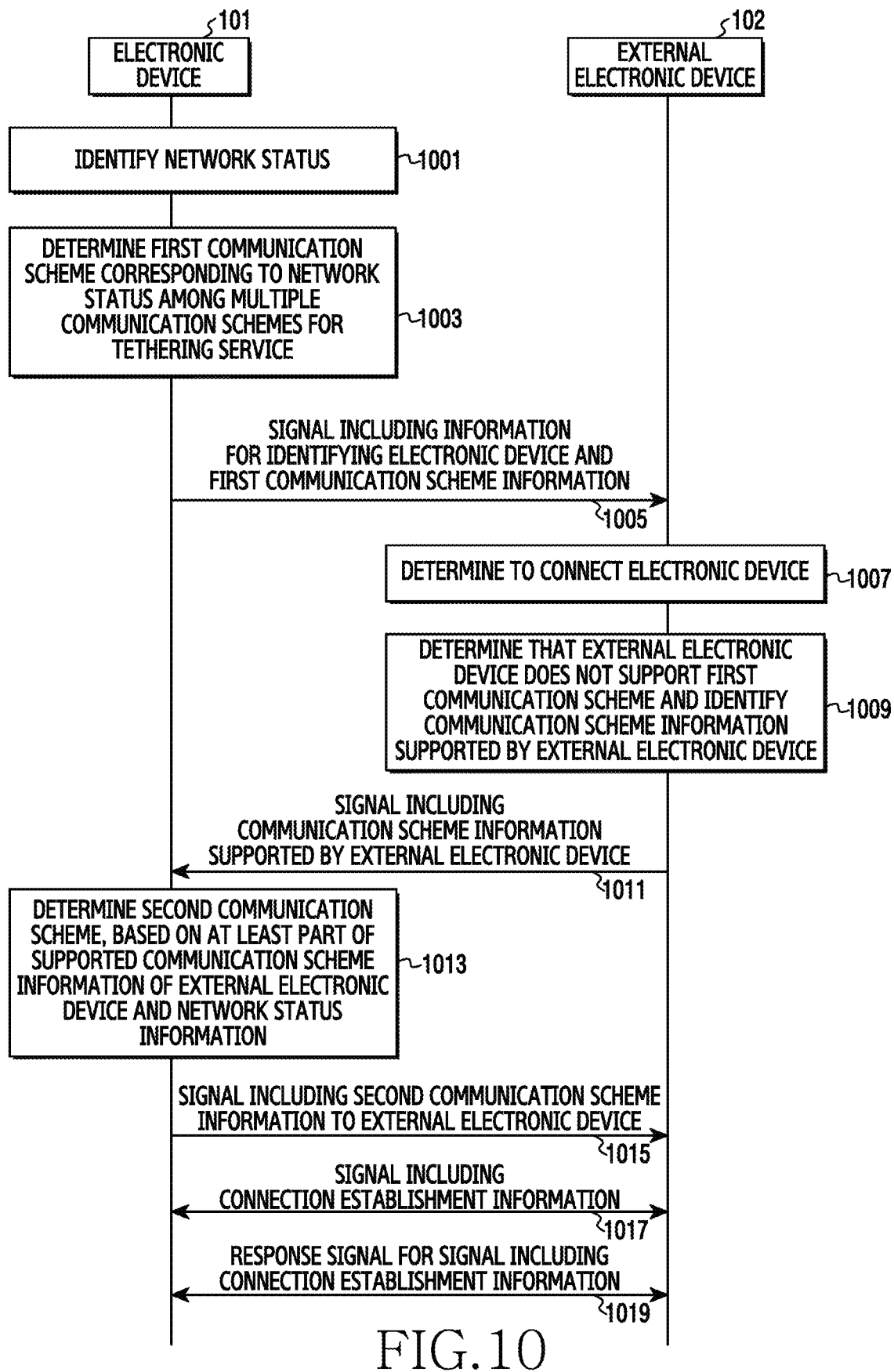
FIG. 10 illustrates a diagram of a system for establishing a connection for a tethering service using a communication scheme determined based on a network status according to various embodiments of the present disclosure.

FIG. 10 illustrates a diagram of a system for establishing a connection for a tethering service using a communication scheme determined based on a network status according to various embodiments of the present disclosure.

In various embodiments, FIG. 10 can, as in FIG. 9, correspond to an embodiment when the external electronic device 102 which receives the tethering service does not support a communication scheme (e.g., a communication standard) determined by the electronic device 101 for the tethering service.

In operation 1001, the electronic device 101 can identify a status of the network 162. In an embodiment, operation 1001 where the electronic device 101 identifies the status of the network 162 is the same as or similar to, in at least part, operation 901 of FIG. 9 and thus its detailed explanations shall be omitted.

In operation 1003, the electronic device 101 can determine a first communication scheme corresponding to the status of the network 162 among multiple communication schemes for the tethering service. For example, the electronic device 101 can determine, but not limited to, the IEEE 802.11ac standard of the WiFi, as the first communication scheme for providing the tethering service to the external electronic device 102.

In operation 1005, the electronic device 101 can broadcast a signal including information (e.g., SSID) for identifying the electronic device 101 and first communication scheme information, using the first communication scheme determined in operation 1003.

For example, when the electronic device 101 determines the communication scheme for providing the tethering service to the external electronic device 102, to the WiFi of the IEEE 802.11ac standard, the electronic device 101 can broadcast a signal including the SSID and IEEE 802.11ac standard information (e.g., information for the communication establishment between the electronic device 101 and the external electronic device 102 using the IEEE 802.11ac standard) or information indicating (or notifying) that the communication scheme determined for the tethering service is the IEEE 802.11ac, using the WiFi of the IEEE 802.11ac standard.

In operation 1007, the external electronic device 102 can determine to connect the electronic device 101. For example, the external electronic device 102 can obtain the broadcast signal from the electronic device 101 and determine to connect the electronic device 101 based on at least part of the obtained signal.

In operation 1009, the external electronic device 102 can determine that it does not support the first communication scheme and identify its supported communication scheme (or communication scheme information).

For example, when the external electronic device 102 does not support the first communication scheme (e.g., the IEEE 802.11ac standard of the WiFi) but supports a communication scheme (e.g., the IEEE 802.11a standard of the WiFi) having a maximum data rate lower than a maximum data rate of the first communication scheme, the external electronic device 102 can determine that it does not support the first communication scheme. The external electronic device 102 can identify its supporting communication scheme, for example, determine that it supports the communication scheme (or communication scheme information) of the maximum data rate lower than the maximum data rate of the first communication scheme.

In operation 1011, the external electronic device 102 can transmit a signal including information about its supporting communication scheme information identified in operation 1009, to the electronic device 101.

In operation 1013, the electronic device 101 can determine a second communication scheme, based on at least part of the supported communication scheme information of the external electronic device 102 and the status information of the network 162.

For example, based on the communication scheme supporting the maximum data rate lower than the maximum data rate of the first communication scheme, which is received from the external electronic device 102, and the status of the network 162, the electronic device 101 can determine, for example, the supported communication scheme (e.g., IEEE 802.11a standard of the WiFi) of the external electronic device 102, to the second communication scheme.

In operation 1015, using the second communication scheme determined, the electronic device 101 can transmit a signal including second communication scheme information, for example, information for establishing communication using the second communication scheme, to the external electronic device 102.

In operation 1017, the external electronic device 102 can transmit a signal including information for establishing the connection using the second communication scheme, to the electronic device 101.

In operation 1019, the electronic device 101 can transmit a response signal to the signal including the connection establishment information using the second communication scheme, to the external electronic device 102.

Although not depicted in FIG. 10, the electronic device 101 may determine the first communication scheme based on the status of the network 162 and the status of the electronic device 101, and determine the second communication scheme based on at least one of the status of the network 162, the status of the electronic device 101, and the supporting communication scheme information of the external electronic device 102.

Figure 11:
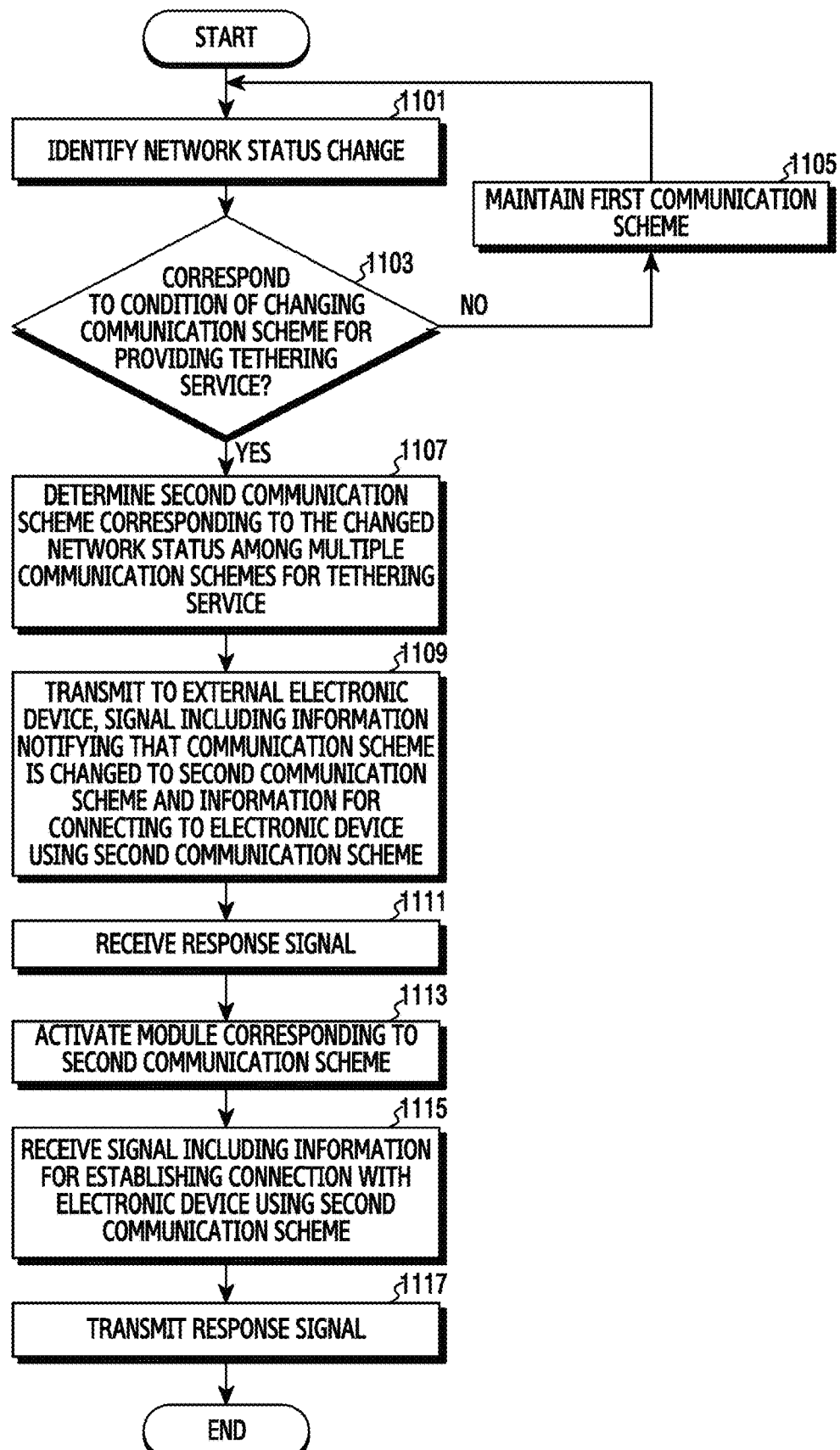
FIG. 11 illustrates a flowchart of a method for an electronic device to change a connection for a tethering service, based on a network status according to various embodiments of the present disclosure.

FIG. 11 illustrates a flowchart of a method for an electronic device to change a connection for a tethering service based on a network status according to various embodiments of the present disclosure.

In operation 1101, the electronic device 101 (e.g., the processor 120) can determine whether the status of the network 162 is changed. For example, the electronic device 101 can determine whether the status of the network 162 is changed during the tethering service to the external electronic device 102 using a current communication scheme (hereafter, referred to as a first communication scheme).

In an embodiment, the electronic device 101 can determine whether the communication scheme between the electronic device 101 and the network 162 is changed. For example, the electronic device 101 can determine whether the communication scheme used to communicate with the network 162 is changed from the LTE to the 3G. For example, the electronic device 101 can identify the communication type change between the electronic device 101 and the network 162, based on at least part of a user input which changes the communication scheme. For example, the electronic device 101 can identify the communication type change between the electronic device 101 and the network 162, based on an application which is set or executed in the electronic device 101. For example, when, but not limited to, voice call data (or voice data packet) is transmitted and received to and from the network 162 using the 3G, the electronic device 101 can determine that the communication scheme is changed from the LTE to the 3G, in response to a voice call received from an external device while transferring data (or data packet) from and to the network 162 using the LTE. For example, the electronic device 101 can determine that the communication scheme is automatically changed from the LTE to the 3G when the channel quality or status between the electronic device 101 and the network 162 is not good.

In another embodiment, the electronic device 101 can determine whether the channel quality or status between the electronic device 101 and the network 162 changes. For example, the electronic device 101 can determine whether, but not limited to, a received signal strength indication, a data rate, an SINR, or a CINR changes.

In an embodiment, the status of the network 162 is not limited to the above-stated communication type or the above-stated channel quality or status between the electronic device 101 and the network 162.

Although not depicted in FIG. 11, in various embodiments, the electronic device 101 can identify the change in not only the status of the network 162 but also the status of the electronic device 101, for example, at least one of a battery capacity of the electronic device 101, a temperature of the electronic device 101, data charge information, a system load of the electronic device 101, a movement status of the electronic device 101, and a location of the electronic device 101.

In operation 1103, the electronic device 101 (e.g., the processor 120) can determine whether the changed status of the network 162 corresponds to a condition of changing the communication scheme for providing the tethering service to the external electronic device 102.

In an embodiment, when the communication type between the electronic device 101 and the network 162 changes, the electronic device 101 can determine that the condition of changing the communication scheme for providing the tethering service to the external electronic device 102 is satisfied.

In another embodiment, when the channel quality or status between the electronic device 101 and the network 162 changes over or below a designated threshold, the electronic device 101 can determine that the condition of changing the communication scheme for providing the tethering service to the external electronic device 102 is satisfied. For example, when the received signal strength between the electronic device 101 and the network 162 falls below a designated threshold, the electronic device 101 can determine that the condition of changing the communication scheme for providing the tethering service to the external electronic device 102 is satisfied.

In various embodiments, the electronic device 101 can determine whether the changed status of the network 162 and the status of the electronic device 101 correspond to the condition of changing the communication scheme for the tethering service, among multiple communication schemes for the tethering service.

When the changed status of the network 162 does not correspond to the condition of changing the communication scheme for providing the tethering service to the external electronic device 102 in operation 1103, the electronic device 101 (e.g., the processor 120) can determine to maintain the first communication scheme between the electronic device 101 and the external electronic device 102 in operation 1105. For example, the electronic device 101 can provide the tethering service to the external electronic device 102 using the first communication scheme, without changing the communication scheme.

In operation 1107, the electronic device 101 (e.g., the processor 120) can determine a second communication scheme corresponding to the changed status of the network 162 among the multiple communication schemes for the tethering service.

In an embodiment, based on at least part of the changed status of the network 162, the electronic device 101 can determine a communication type, a communication standard, or an antenna technique, for providing the tethering service to the external electronic device 102. For example, when the communication type between the electronic device 101 and the network 162 changes from the LTE to the 3G during the tethering service to the external electronic device 102 using the WiFi IEEE 802.11ac and the MIMO antenna technique, the electronic device 101 can determine, but not limited to, the WiFi IEEE 802.11ac and the MIMO antenna technique, as the second communication scheme.

In various embodiments, the electronic device 101 can determine the second communication scheme, based on at least part of the changed status of the network 162 or the status of the electronic device 101 among the multiple communication schemes for the tethering service.

In operation 1109, the electronic device 101 (e.g., the processor 120) can transmit to the external electronic device 102 a signal including information for notifying (or indicating) that the communication scheme is determined (or changed) to the second communication scheme and information for connecting the external electronic device 102 to the electronic device 101 using the second communication scheme.

For example, when determining the Bluetooth as the second communication scheme, the electronic device 101 can transmit to the external electronic device 102 a signal including, but not limited to, information for notifying that the communication scheme is changed from the first communication scheme to the second communication scheme (e.g., Bluetooth) and information (e.g., BD address of the electronic device 101) for connecting the external electronic device 102 to the electronic device 101 using the second communication scheme (e.g., Bluetooth).

In operation 1111, the electronic device 101 (e.g., the processor 120) can receive a response signal from the external electronic device 102. For example, the electronic device 101 can receive from the external electronic device 102 a signal including, but not limited to, information for connecting the communication with the external electronic device 102 using the second communication scheme.

In operation 1113, the electronic device 101 (e.g., the processor 120) can activate a module corresponding to the second communication scheme. For example, when the second communication scheme is the Bluetooth, the electronic device 101 can activate (or turn on) the Bluetooth module 223 in response to the received response signal of operation 1109.

In FIG. 11, the electronic device 101 activates the module corresponding to the second communication scheme in response to, but not limited to, the response signal received from the external electronic device 102 of operation 1109. For example, the electronic device 101 may activate the module corresponding to the second communication scheme in operation 1113 after the second communication scheme is determined in operation 1107 or after the signal is transmitted to the external electronic device 102 in operation 1109.

In operation 1115, the electronic device 101 (e.g., the processor 120) can receive a signal including information for establishing connection with the electronic device 101 using the second communication scheme, from the external electronic device 102. For example, when the second communication scheme is, but not limited to, the Bluetooth, the electronic device 101 can receive authentication information or association information from the external electronic device 102 using the Bluetooth.

In operation 1117, in response to the signal received in operation 1115, the electronic device 101 (e.g., the processor 120) can transmit a response signal to the external electronic device 102. For example, when the second communication scheme is, but not limited to, the Bluetooth, the electronic device 101 can transmit a response signal to the external electronic device 102 using the Bluetooth.

In an embodiment, by transmitting the response signal to the external electronic device 102, the electronic device 101 may establish the communication with the external electronic device 102 using the second communication scheme. Although not depicted in FIG. 11, the electronic device 101 can provide the tethering service to the external electronic device 102 using the second communication scheme.

Although not depicted in FIG. 11, after transmitting the response signal to the external electronic device 102 in operation 1117, the electronic device 101 can release the connection using the first communication scheme. For example, after accessing the external electronic device 102 using the second communication scheme by transmitting the response signal to the external electronic device 102 in operation 1117, the electronic device 101 can release the connection using the first communication scheme by, but not limited to, transmitting to the external electronic device 102 a signal including information for releasing the communication using the first communication scheme and receiving a response signal from the external electronic device 102. According to an embodiment, when determining to provide the tethering service to the external electronic device 102 by switching to the second communication scheme (e.g., Bluetooth), the electronic device 101 can transmit information notifying the change of the communication scheme, to the external electronic device 102 using the second communication scheme (e.g., Bluetooth) and then end the connection of the first communication in operation 1109.

Figure 12:
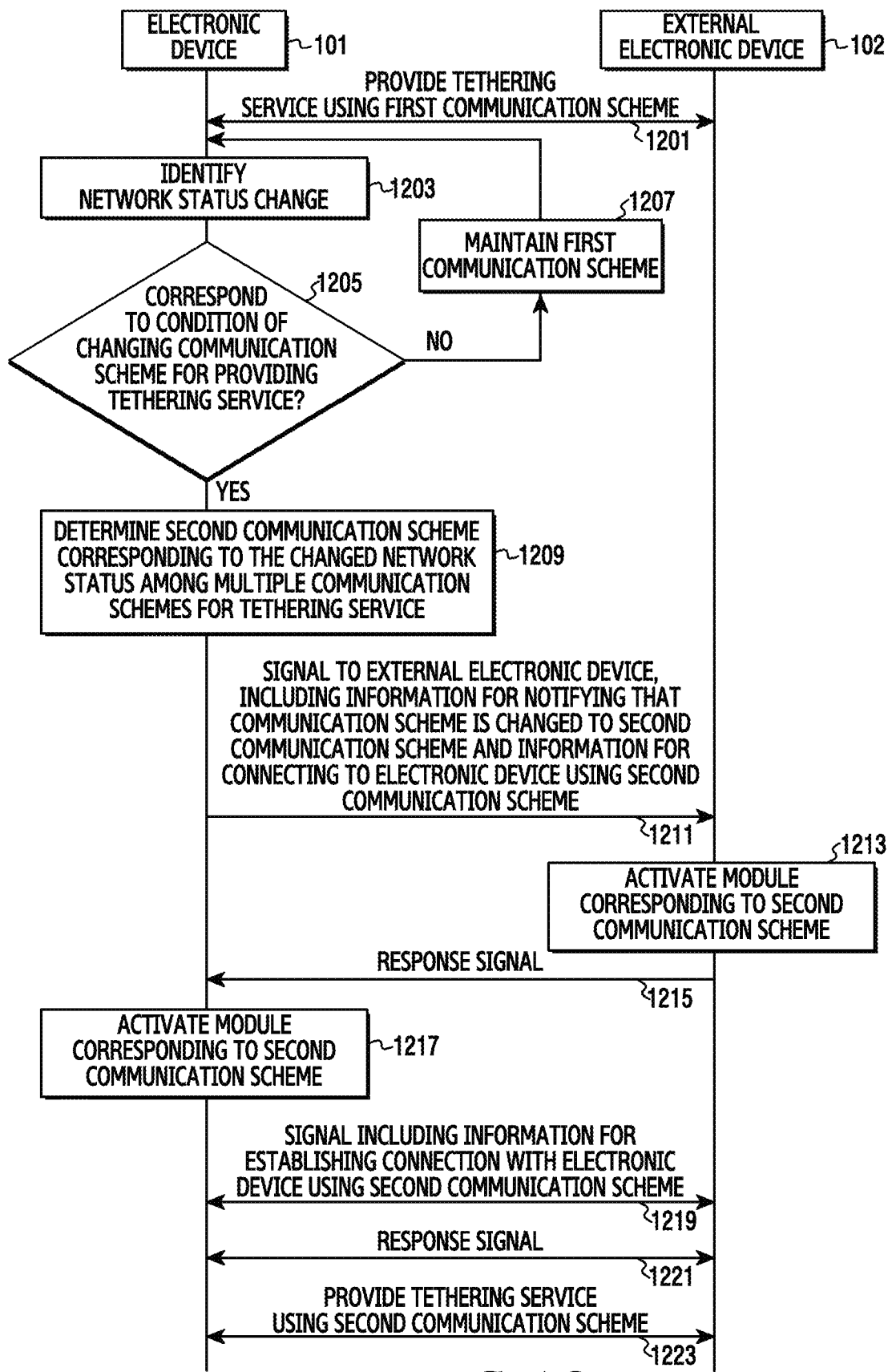
FIG. 12 illustrates a diagram of a system for changing a connection for a tethering service, based on a network status according to various embodiments of the present disclosure.

FIG. 12 illustrates a diagram of a system for changing a connection for a tethering service based on a network status according to various embodiments of the present disclosure.

Referring to FIG. 12, the electronic device 101 can provide a tethering service to the external electronic device 102 using a first communication scheme in operation 1201.

In operation 1203, the electronic device 101 can determine whether a status of the network 162 is changed. For example, the electronic device 101 can determine whether the status of the network 162 is changed during the tethering service to the external electronic device 102 using the first communication scheme.

In an embodiment, the electronic device 101 can determine whether a communication type between the electronic device 101 and the network 162 or a channel quality or status between the electronic device 101 and the network 162 changes. In an embodiment, the status of the network 162 is not limited to the above-stated communication type or the above-stated channel quality or status between the electronic device 101 and the network 162.

In operation 1205, the electronic device 101 can determine whether the changed status of the network 162 corresponds to a condition of changing the communication scheme for providing the tethering service to the external electronic device 102.

For example, when the communication type between the electronic device 101 and the network 162 changes or when the channel quality or status between the electronic device 101 and the network 162 changes over or below a designated threshold, the electronic device 101 can determine that the condition of changing the communication scheme for providing the tethering service to the external electronic device 102 is satisfied.

When the changed status of the network 162 does not correspond to the condition of changing the communication scheme for providing the tethering service to the external electronic device 102 in operation 1205, the electronic device 101 can determine to maintain the first communication scheme between the electronic device 101 and the external electronic device 102 in operation 1207. For example, the electronic device 101 can provide the tethering service to the external electronic device 102 using the first communication scheme, without changing the communication scheme.

In operation 1209, the electronic device 101 can determine a second communication scheme corresponding to the changed status of the network 162 among the multiple communication schemes for the tethering service.

In an embodiment, based on at least part of the changed status of the network 162, the electronic device 101 can determine a communication type, a communication standard, or an antenna technique, for providing the tethering service to the external electronic device 102.

In operation 1211, the electronic device 101 can transmit to the external electronic device 102 a signal including information for notifying (or indicating) that the communication scheme is determined (or changed) to the second communication scheme and information for connecting the external electronic device 102 to the electronic device 101 using the second communication scheme. For example, the electronic device 101 can transmit to the external electronic device 102 a signal including information for notifying that the communication scheme is changed to the second communication scheme and information for connecting the external electronic device 102 to the electronic device 101 using the second communication scheme, using the first communication scheme.

In operation 1213, the external electronic device 102 can activate a module corresponding to the second communication scheme, in response to the signal received from the electronic device 101. For example, when the second communication scheme is the Bluetooth, the external electronic device 102 can activate the Bluetooth module 223. Notably, the external electronic device 102 may activate the module corresponding to the second communication scheme after the response signal is transmitted to the electronic device 101 in operation 1215.

In operation 1215, the external electronic device 102 can transmit a response signal to the electronic device 101, in response to the signal received from the electronic device 101. For example, the external electronic device 102 can transmit to the electronic device 101 a signal including information for connecting the communication with the external electronic device 102 using the second communication scheme.

In operation 1217, the electronic device 101 can activate a module corresponding to the second communication scheme. For example, when the second communication scheme is the Bluetooth, the electronic device 101 can activate (or turn on) the Bluetooth module 223 in response to the received response signal of operation 1215.

In FIG. 12, the electronic device 101 activates the module corresponding to the second communication scheme in response to, but not limited to, the response signal received from the external electronic device 102 of operation 1215. For example, the electronic device 101 may activate the module corresponding to the second communication scheme in operation 1217 after the second communication scheme is determined in operation 1209 or after the signal is transmitted to the external electronic device 102 in operation 1211.

In operation 1219, the external electronic device 102 can transmit a signal including information for establishing connection with the electronic device 101 using the second communication scheme. For example, the electronic device 101 can receive, but not limited to, authentication information or association information from the external electronic device 102.

In response to the signal received in operation 1219, the electronic device 101 can transmit a response signal to the external electronic device 102 in operation 1221.

In operation 1223, the electronic device 101 can provide the tethering service to the external electronic device 102 using the second communication scheme.

Figure 13:
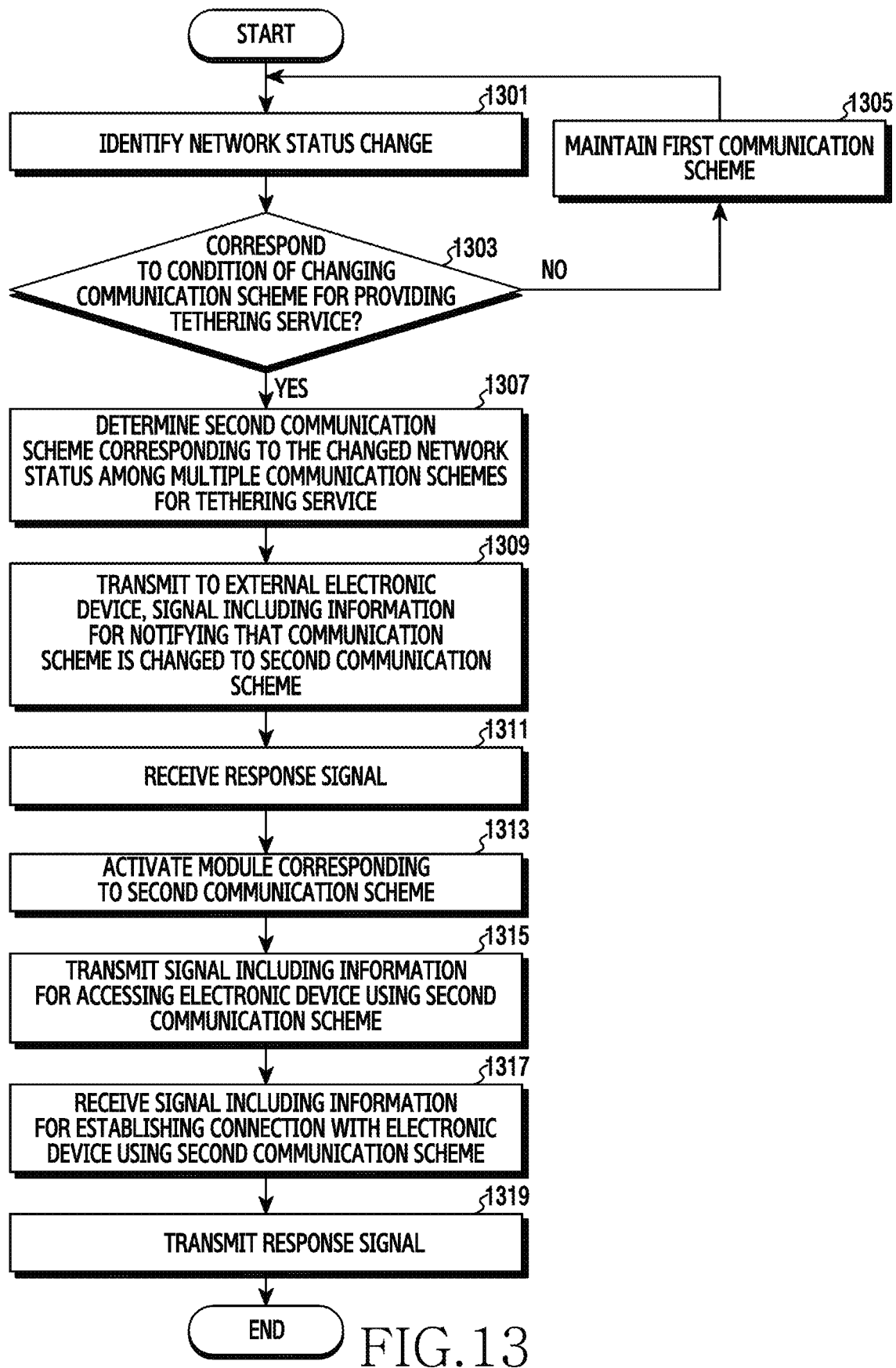
FIG. 13 illustrates a flowchart of a method for an electronic device to change a connection for a tethering service, based on a network status according to various embodiments of the present disclosure.

FIG. 13 illustrates a flowchart of a method for an electronic device to change a connection for a tethering service, based on a network status according to various embodiments of the present disclosure.

In operation 1301, the electronic device 101 (e.g., the processor 120) can determine whether a status of the network 162 is changed.

In operation 1303, the electronic device 101 (e.g., the processor 120) can determine whether the changed status of the network 162 corresponds to a condition of changing a communication scheme for providing a tethering service to the external electronic device 102.

When the changed status of the network 162 does not correspond to the condition of changing the communication scheme for providing the tethering service to the external electronic device 102 in operation 1303, the electronic device 101 (e.g., the processor 120) can determine to maintain a first communication scheme between the electronic device 101 and the external electronic device 102 in operation 1305.

When the changed status of the network 162 corresponds to the condition of changing the communication scheme for providing the tethering service to the external electronic device 102 in operation 1303, the electronic device 101 (e.g., the processor 120) can determine a second communication scheme corresponding to the changed status of the network 162 among multiple communication schemes for the tethering service in operation 1307.

In an embodiment, operations 1301 through 1307 are, in at least part, the same as or similar to operations 1101 through 1107 of FIG. 11 and thus their detailed explanations shall be omitted.

In operation 1309, the electronic device 101 (e.g., the processor 120) can transmit to the external electronic device 102 a signal including information for notifying (or indicating) that the communication scheme is determined (or changed) to the second communication scheme.

For example, when determining the Bluetooth as the second communication scheme, the electronic device 101 can transmit to the external electronic device 102 a signal including, but not limited to, information for notifying that the communication scheme is determined to the Bluetooth.

In operation 1311, the electronic device 101 (e.g., the processor 120) can receive a response signal from the external electronic device 102. In an embodiment, the external electronic device 102 can, but not limited to, receive the information notifying that the second communication scheme is determined as the communication scheme, and then activate a module corresponding to the second communication scheme.

In operation 1313, the electronic device 101 (e.g., the processor 120) can activate a module corresponding to the second communication scheme. For example, when the second communication scheme is the Bluetooth, the electronic device 101 can activate (or turn on) the Bluetooth module 223 in response to the received response signal of operation 1311.

In FIG. 13, the electronic device 101 activates the module corresponding to the second communication scheme in operation 1313 in response to, but not limited to, the response signal received from the external electronic device 102. For example, the electronic device 101 may activate the module corresponding to the second communication scheme in operation 1313 after the second communication scheme is determined in operation 1307 or after the signal is transmitted to the external electronic device 102 in operation 1309.

In operation 1315, the electronic device 101 (e.g., the processor 120) can transmit a signal including information for accessing the electronic device 101 using the second communication scheme. For example, the electronic device 101 can transmit a signal including information for connecting the external electronic device 102 to the electronic device 101 using the second communication scheme, to the external electronic device 102.

In operation 1317, the electronic device 101 (e.g., the processor 120) can receive a signal including information for establishing connection with the electronic device 101 using the second communication scheme, from the external electronic device 102. For example, the electronic device 101 can receive, but not limited to, a signal requesting authentication and association for the connection using the second communication scheme, from the external electronic device 102.

In operation 1319, in response to the signal received in operation 1317, the electronic device 101 (e.g., the processor 120) can transmit a response signal to the external electronic device 102. In an embodiment, by transmitting the response signal to the external electronic device 102, the electronic device 101 may establish the connection with the external electronic device 102 using the second communication scheme. Although not depicted in FIG. 13, the electronic device 101 can provide the tethering service to the external electronic device 102 using the second communication scheme.

Although not depicted in FIG. 13, after transmitting the response signal to the external electronic device 102 in operation 1319, the electronic device 101 can release the connection using the first communication scheme. For example, after accessing the external electronic device 102 using the second communication scheme by transmitting the response signal to the external electronic device 102 in operation 1319, the electronic device 101 can release the connection using the first communication scheme by, but not limited to, transmitting to the external electronic device 102 a signal including information for releasing the communication using the first communication scheme and receiving a response signal from the external electronic device 102.

Unlike FIG. 11, the electronic device 101 of FIG. 13 can transmit information notifying the change of the communication scheme to the second communication scheme, to the external electronic device 102 in operation 1309, activate the module corresponding to the second communication scheme in operation 1313, and then transmit the signal including the information for connecting the external electronic device 102 to the electronic device 101.

Figure 14:
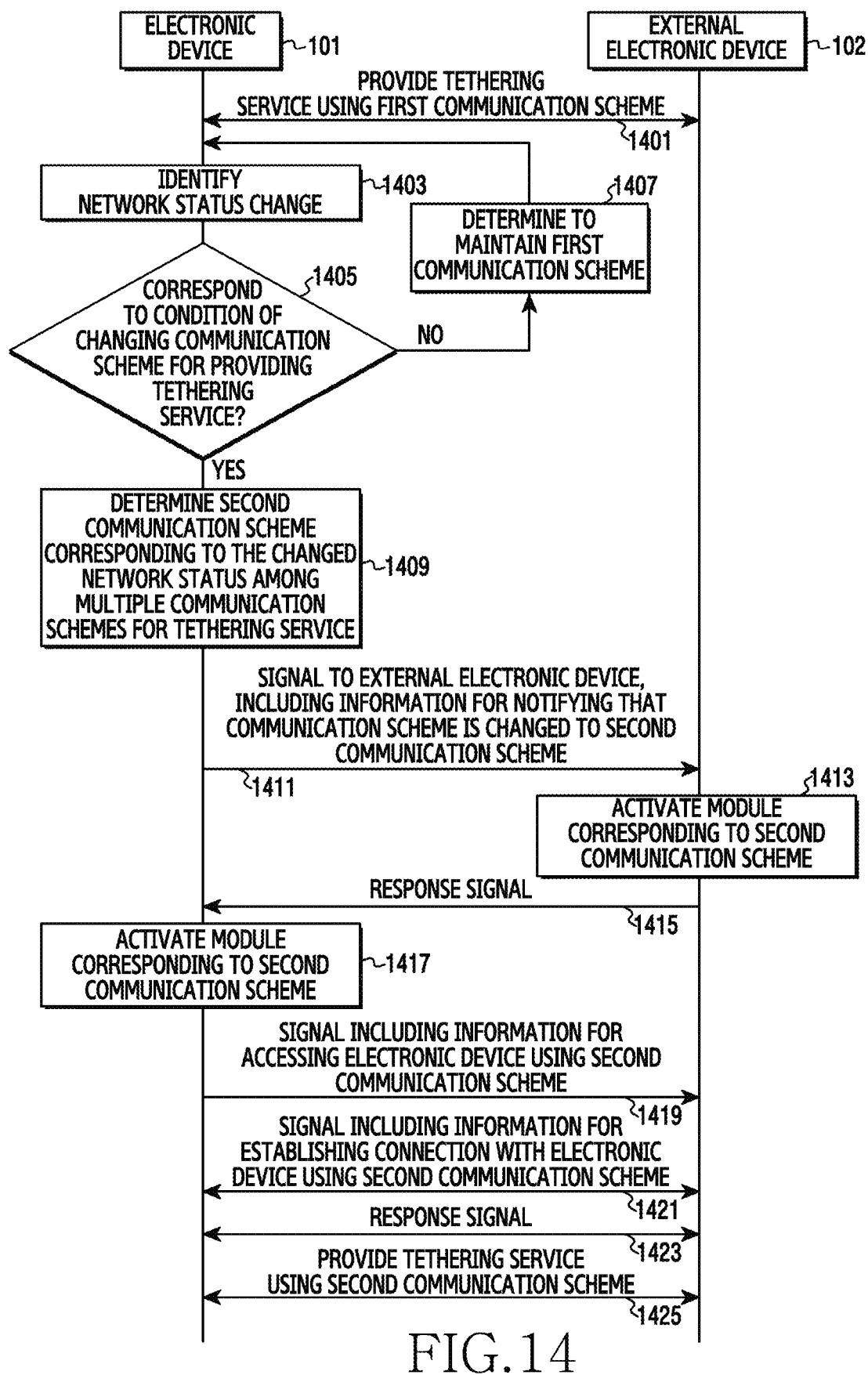
FIG. 14 illustrates a diagram of a system for changing a connection for a tethering service, based on a network status according to various embodiments of the present disclosure.

FIG. 14 illustrates a diagram of a system for changing a connection for a tethering service based on a network status according to various embodiments of the present disclosure.

Referring to FIG. 14, the electronic device 101 can provide a tethering service to the external electronic device 102 using a first communication scheme in operation 1401.

In operation 1405, the electronic device 101 can determine whether a changed status of the network 162 corresponds to a condition of changing the communication scheme for providing the tethering service to the external electronic device 102.

When the changed status of the network 162 does not correspond to the condition of changing the communication scheme for providing the tethering service to the external electronic device 102 in operation 1405, the electronic device 101 can determine to maintain the first communication scheme between the electronic device 101 and the external electronic device 102 in operation 1407.

In operation 1409, the electronic device 101 can determine a second communication scheme corresponding to the changed status of the network 162, among the multiple communication schemes for the tethering service.

In an embodiment, operations 1401 through 1407 are, in at least part, the same as or similar to operations 1101 through 1107 of FIG. 11 and operations 1301 through 1307 of FIG. 13 and thus their detailed explanations shall be omitted.

In operation 1411, the electronic device 101 can transmit to the external electronic device 102 a signal including information for notifying (or indicating) that the communication scheme is determined (or changed) to the second communication scheme.

For example, when determining, but not limited to, the Bluetooth as the second communication scheme, the electronic device 101 can transmit to the external electronic device 102 a signal including information for notifying that the communication scheme is determined to the Bluetooth.

After receiving the information notifying that the communication scheme is determined to the second communication scheme, the external electronic device 102 can activate a module corresponding to the second communication scheme in operation 1413. For example, when the second communication scheme is the Bluetooth, the external electronic device 102 can activate the Bluetooth module 223. Notably, the external electronic device 102 may activate the module corresponding to the second communication scheme after transmitting a response signal to the electronic device 101 in operation 1415.

In operation 1415, the external electronic device 102 can transmit a response signal to the electronic device 101.

In operation 1417, the electronic device 102 can activate a module corresponding to the second communication scheme. For example, when the second communication scheme is the Bluetooth, the electronic device 102 can activate (or turn on) the Bluetooth module 223 in response to the received response signal of operation 1415.

In FIG. 14, the electronic device 101 activates the module corresponding to the second communication scheme in response to, but not limited to, the response signal received from the external electronic device 102 of operation 1415. For example, the electronic device 101 may activate the module corresponding to the second communication scheme in operation 1417 after the second communication scheme is determined in operation 1409 or after the signal is transmitted to the external electronic device 102 in operation 1411.

In operation 1419, the electronic device 101 can transmit a signal including information for accessing the electronic device 101 using the second communication scheme. For example, the electronic device 101 can transmit information for connecting the external electronic device 102 to the electronic device 101 using the second communication scheme, to the external electronic device 102.

In operation 1421, the external electronic device 102 can transmit a signal including information for establishing connection with the electronic device 101 using the second communication scheme, to the electronic device 101. For example, the external electronic device 102 can transmit, but not limited to, a signal requesting authentication and association for the connection using the second communication scheme, to the electronic device 101.

In operation 1423, in response to the signal received in operation 1421, the electronic device 101 can transmit a response signal to the external electronic device 102. In an embodiment, by transmitting the response signal to the external electronic device 102, the electronic device 101 may establish the communication with the external electronic device 102 using the second communication scheme.

In operation 1425, the electronic device 101 can provide the tethering service to the external electronic device 102 using the second communication scheme.

Unlike FIG. 12, the electronic device 101 of FIG. 14 can transmit the information notifying the change of the communication scheme to the second communication scheme, to the external electronic device 102 in operation 1411, activate the module corresponding to the second communication scheme in operation 1417, and then transmit the signal including the information for connecting the external electronic device 102 to the electronic device 101.

Figure 15:
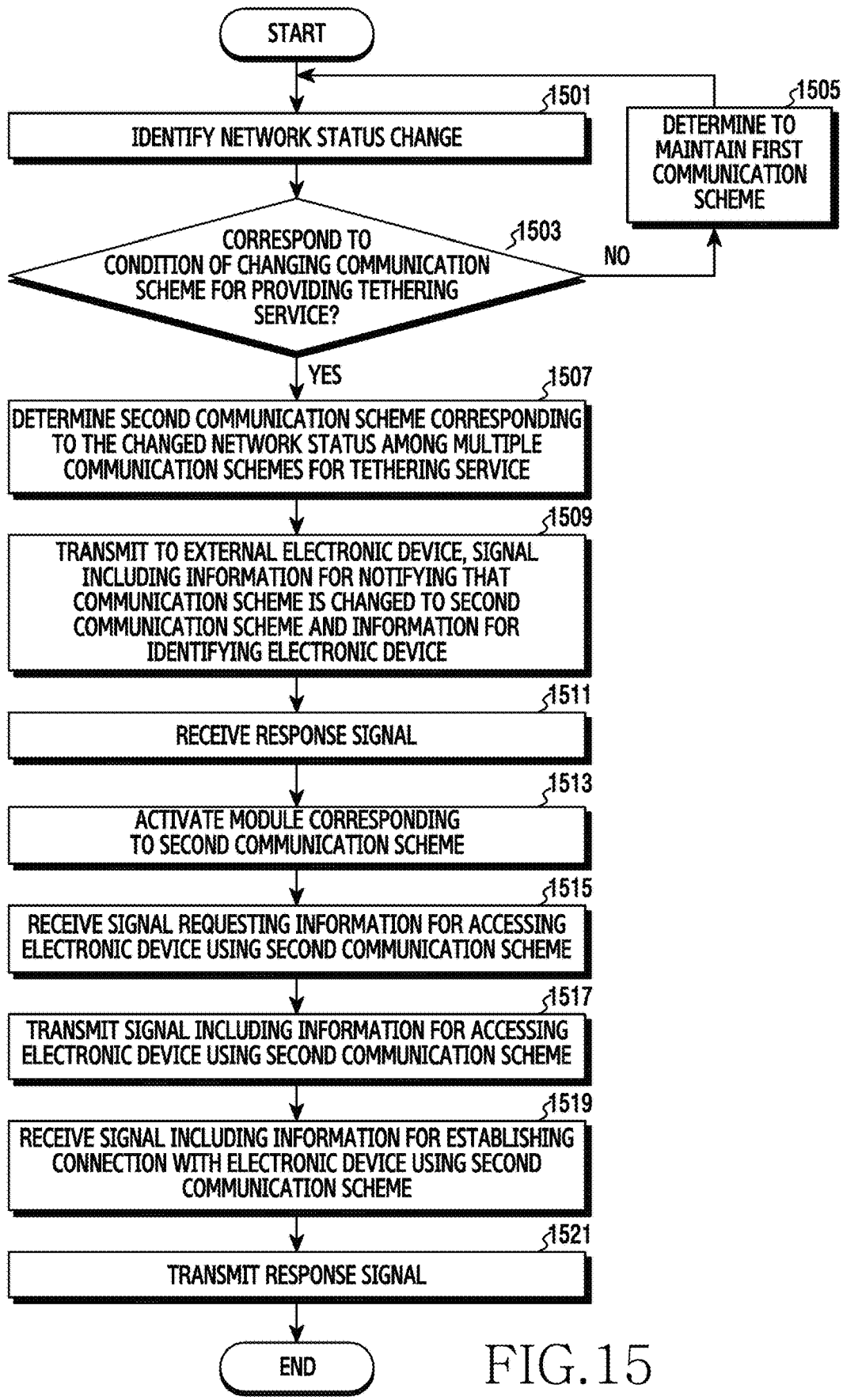
FIG. 15 illustrates a flowchart of a method for an electronic device to change a connection for a tethering service, based on a network status according to various embodiments of the present disclosure.

FIG. 15 illustrates a flowchart of a method for an electronic device to change a connection for a tethering service based on a network status according to various embodiments of the present disclosure.

Compared with FIG. 13, the method of FIG. 15 can further include operation 1515. For example, operations 1501 through 1513 of FIG. 15 are, in at least part, the same as or similar to operations 1301 through 1313 of FIG. 13, and operations 1517 through 1521 of FIG. 15 are, in at least part, the same as or similar to operations 1315 through 1319 of FIG. 13.

In operation 1515, the electronic device 101 (e.g., the processor 120) can receive from the external electronic device 102 a signal requesting information for connecting the external electronic device 102 to the electronic device 101 using a second communication scheme.

In an embodiment, the signal requesting the information for connecting the external electronic device 102 to the electronic device 101 using the second communication scheme can further include a signal indicating that the external electronic device 102 activates a module corresponding to the second communication scheme.

In an embodiment, based on at least part of the received signal, the electronic device 101 can identify the module activated by the external electronic device 102 corresponding to the second communication scheme, and then transmit a signal including the information for connecting the external electronic device 102 to the electronic device 101 using the second communication scheme, in operation 1517.

Figure 16:
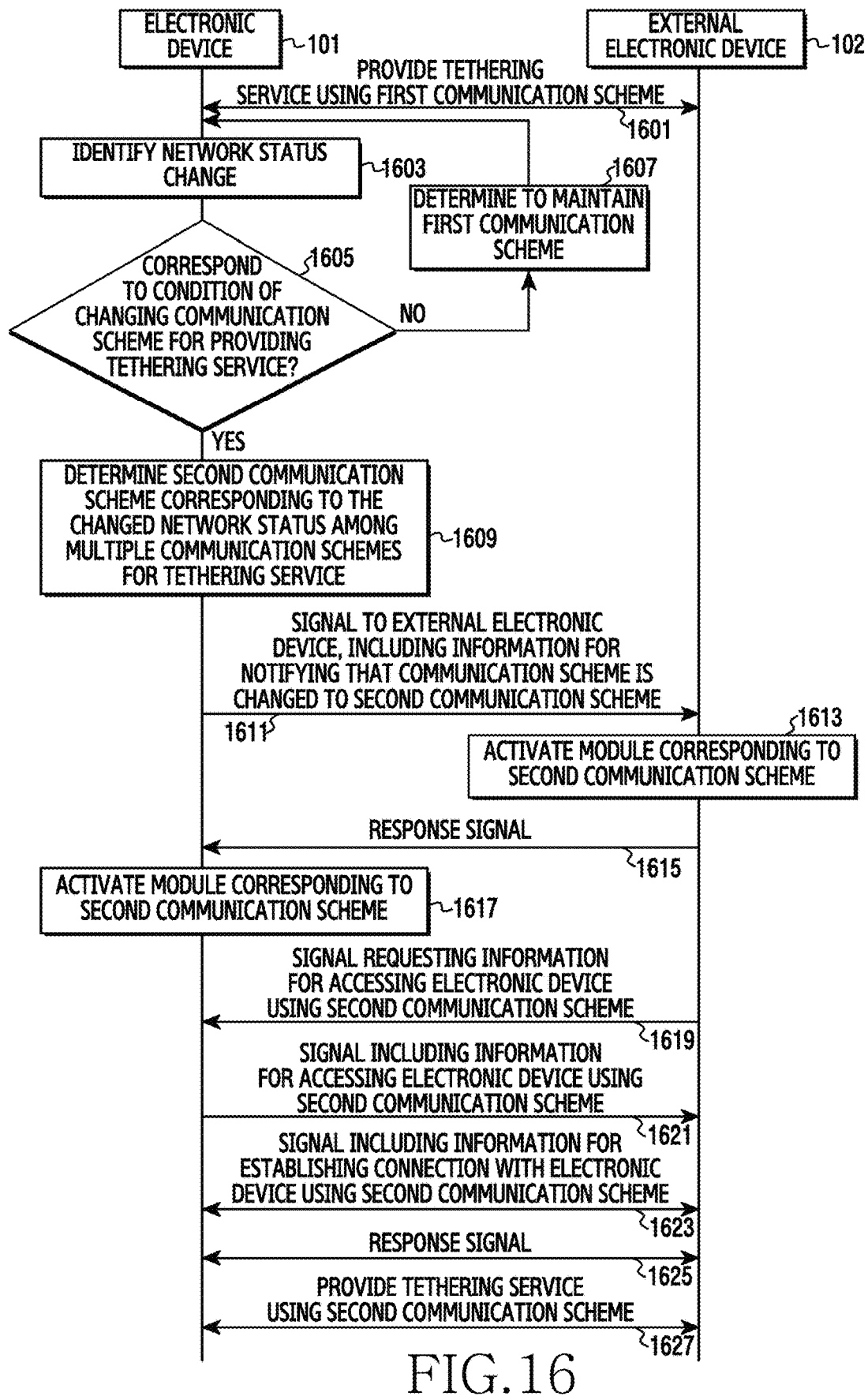
FIG. 16 illustrates a diagram of a system for changing a connection for a tethering service, based on a network status according to various embodiments of the present disclosure.

FIG. 16 illustrates a diagram of a system for changing a connection for a tethering service based on a network status according to various embodiments of the present disclosure.

Compared with FIG. 14, the method of FIG. 16 can further include operation 1619. For example, operations 1601 through 1617 of FIG. 16 are, in at least part, the same as or similar to operations 1401 through 1417 of FIG. 14, and operations 1621 through 1627 of FIG. 16 are, in at least part, the same as or similar to operations 1419 through 1426 of FIG. 14.

In operation 1619, the external electronic device 102 can transmit to the electronic device 101 a signal requesting information for connecting the external electronic device 102 to the electronic device 101 using a second communication scheme.

In an embodiment, the signal requesting the information for connecting the external electronic device 102 to the electronic device 101 using the second communication scheme can further include a signal indicating that the external electronic device 102 activates a module corresponding to the second communication scheme.

In an embodiment, based on at least part of the received signal, the electronic device 101 can identify the module activated by the external electronic device 102 corresponding to the second communication scheme, and then transmit a signal including the information for connecting the external electronic device 102 to the electronic device 101 using the second communication scheme, in operation 1621.

Figure 17:
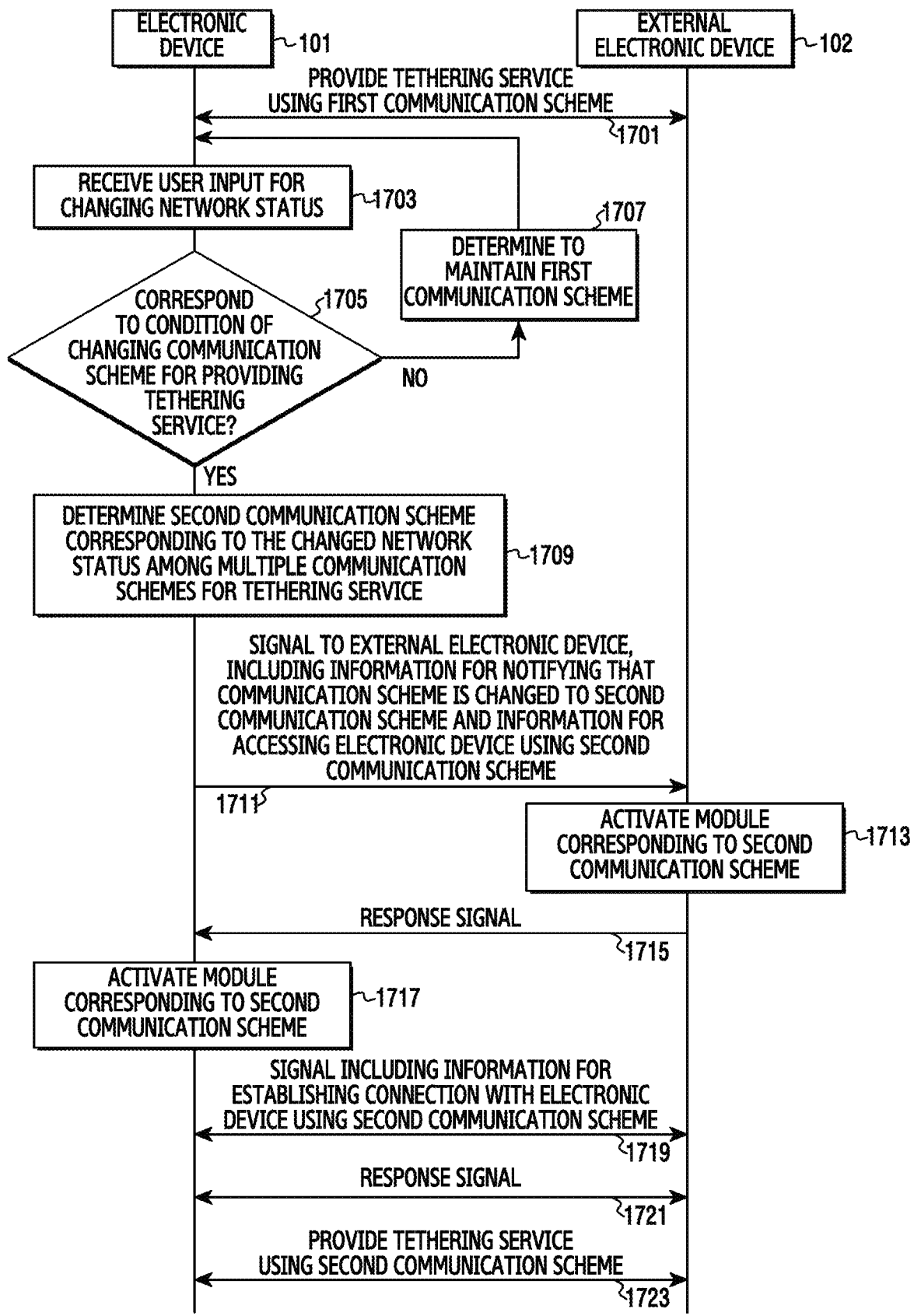
FIG. 17 illustrates a diagram of a system for changing a connection for a tethering service according to a user input which changes a status of a network connected to an electronic device according to various embodiments of the present disclosure.

FIG. 17 illustrates a diagram of a system for changing a connection for a tethering service according to a user input which changes a status of a network connected to an electronic device according to various embodiments of the present disclosure.

FIGS. 18A and 18B are diagrams illustrating connection change for a tethering service according to a user input which changes a status of a network 162 connected to an electronic device according to various embodiments of the present disclosure.

Referring to FIG. 17 and FIGS. 18A and 18B, in operation 1701, the electronic device 101 (e.g., the processor 120) can provide a tethering service to the external electronic device 102 using a first communication scheme.

In operation 1703, the electronic device 101 (e.g., the processor 120) can receive a user input which changes a status of the network 162. For example, the electronic device 101 can receive a user input which changes a communication scheme between the electronic device 101 and the network 162. Referring to FIG. 18A, for example, the electronic device 101 can display an indication 1810 of a current communication scheme (e.g., LTE) of the network 162, in its status display region 1820 of a display.

In an embodiment, when receiving the user input regarding the indication 1810 of the current communication scheme of the network 162, the electronic device 101 can display multiple communication schemes supported by the electronic device 101 between the electronic device 101 and the network 162 as shown in FIG. 18B. For example, based on at least part of the user input for the indication 1810 or a user input for an application (e.g., the application 370) which changes settings of the electronic device 101, the electronic device 101 can display information about the communication schemes, such as LTE, 3G, and 2G, between the electronic device 101 and the network 162, and input fields 1830, 1840, and 1850 for selecting one of the communication schemes between the electronic device 101 and the network 162. In an embodiment, in response to the user input on the input field 1830 of the LTE, the electronic device 101 can determine the LTE as the communication scheme between the electronic device 101 and the network 162.

Figure 18:
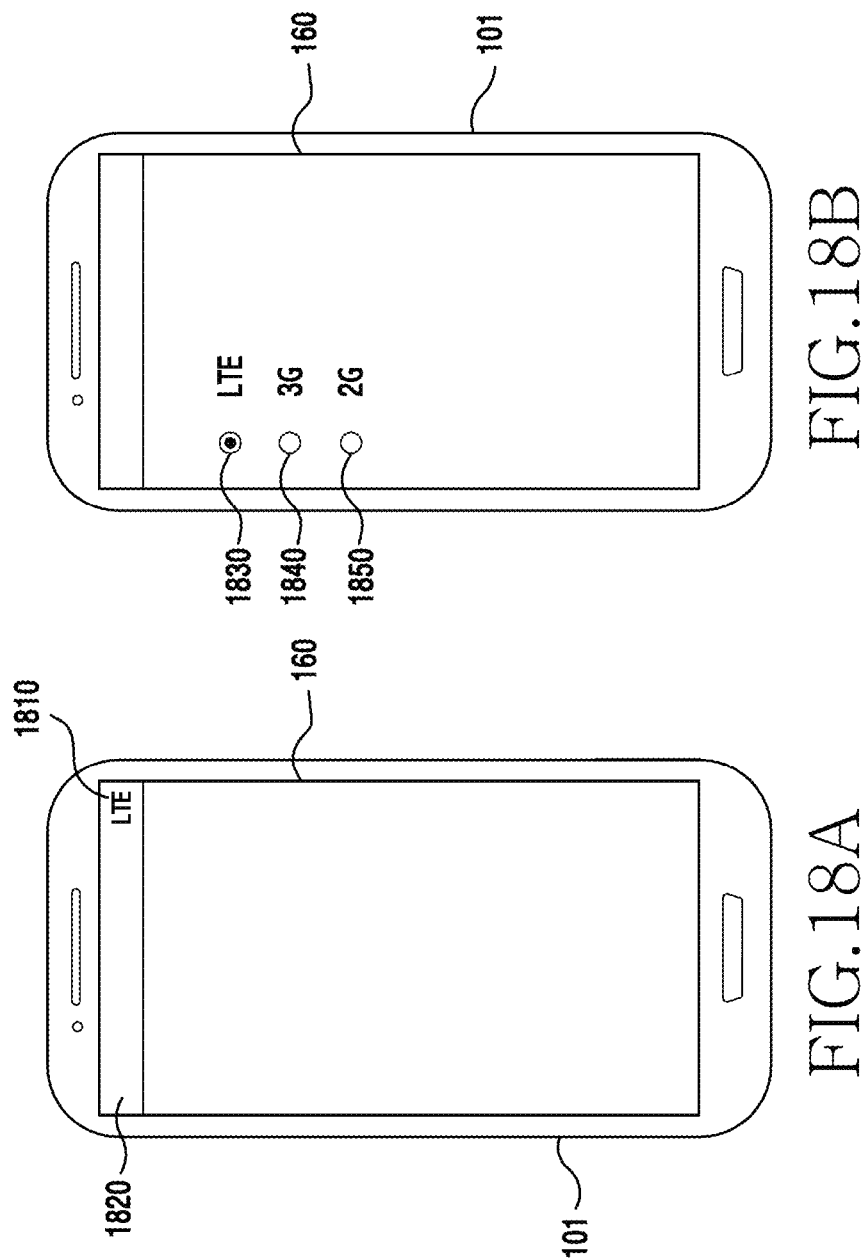
FIGS. 18A and 18B are diagrams illustrating a method for changing a connection for a tethering service according to a user input which changes a status of a network connected to an electronic device according to various embodiments of the present disclosure.

It is noted that the method for selecting the communication scheme between the electronic device 101 and the network 162 is not limited to the embodiment of FIG. 18.

In operation 1705, the electronic device 101 (e.g., the processor 120) can determine whether the changed status (or the communication type between the electronic device 101 and the network 162) of the network 162 corresponds to a condition of changing the communication scheme for providing the tethering service to the external electronic device 102. For example, when the communication scheme between the electronic device 101 and the network 162 is changed, but not limited to, from the LTE to the 3G according to the user input, the electronic device 101 can determine that the communication type corresponds to the condition of changing the communication scheme for providing the tethering service to the external electronic device 102.

In various embodiments, operations 1707 through 1723 of FIG. 17 are, in at least part, the same as or similar to operations 1207 through 1223 of FIG. 12 and thus their detailed explanations shall be omitted.

Figure 19:
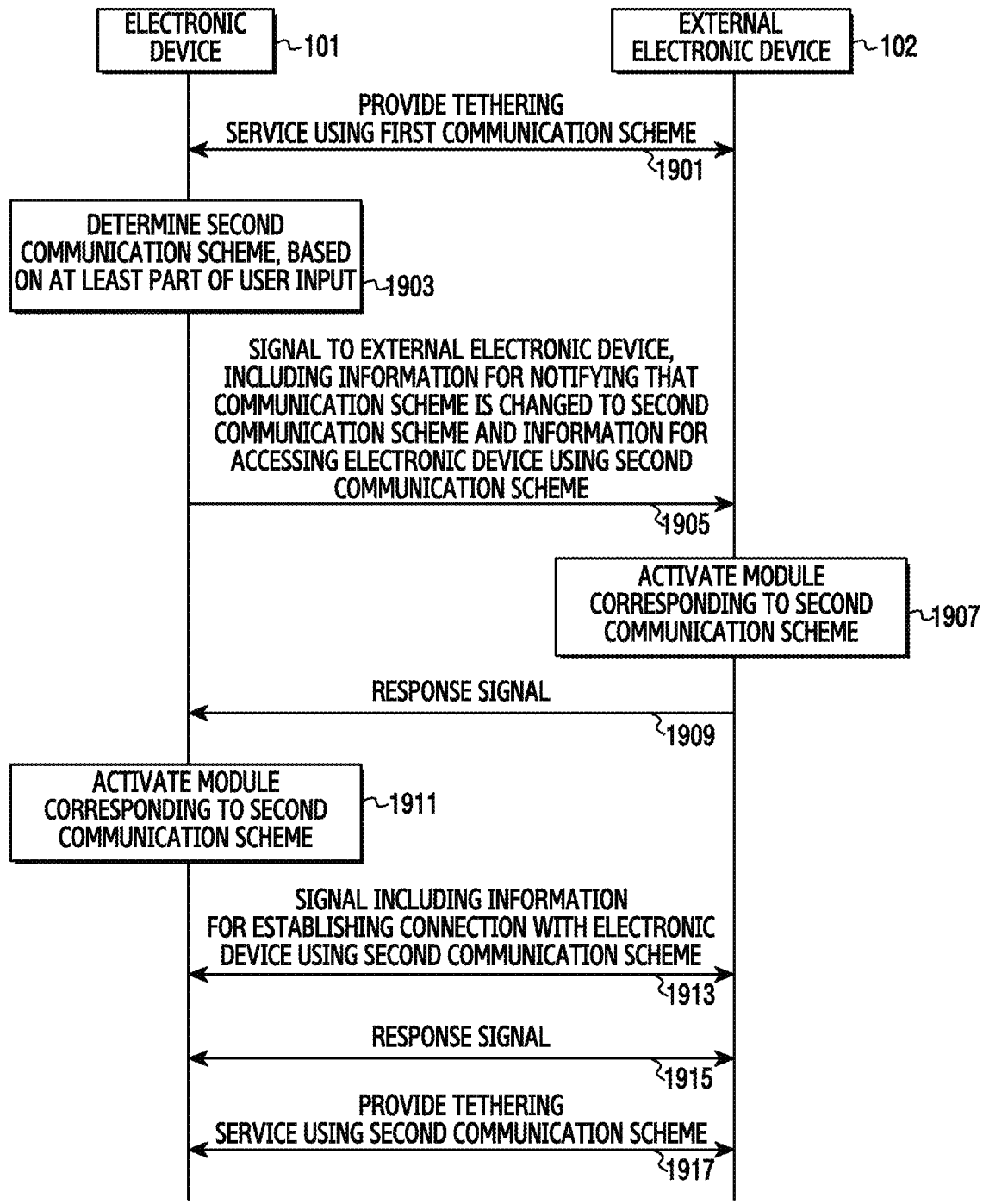
FIG. 19 illustrates a diagram of a method for an electronic device to change a communication scheme for providing a tethering service, based on a user input according to various embodiments of the present disclosure.

FIG. 19 illustrates a diagram of a method of an electronic device for changing a communication scheme for providing a tethering service, based on a user input according to various embodiments of the present disclosure.

Referring to FIG. 19, in operation 1901, the electronic device 101 (e.g., the processor 120) can provide a tethering service to the external electronic device 102 using a first communication scheme.

In operation 1903, the electronic device 101 (e.g., the processor 120) can determine a second communication scheme as the communication scheme for providing the tethering service to the external electronic device 102, based on at least part of a user input.

In an embodiment, based on at least part of the user input, the electronic device 101 can display a plurality of communication schemes for providing the tethering service to the external electronic device 102. In response to a received user input which selects the second communication scheme among the displayed communication schemes, the electronic device 101 can determine the second communication scheme as the communication scheme for providing the tethering service to the external electronic device 102. In an embodiment, the second communication scheme can be a first communication scheme which is currently used to provide the tethering service based on the user input, or a different communication scheme from the first communication scheme.

In various embodiments, operations 1905 through 1917 are, in at least part, the same as or similar to operations 1211 through 1223 of FIG. 12 and thus their detailed explanations shall be omitted.

Figure 20:
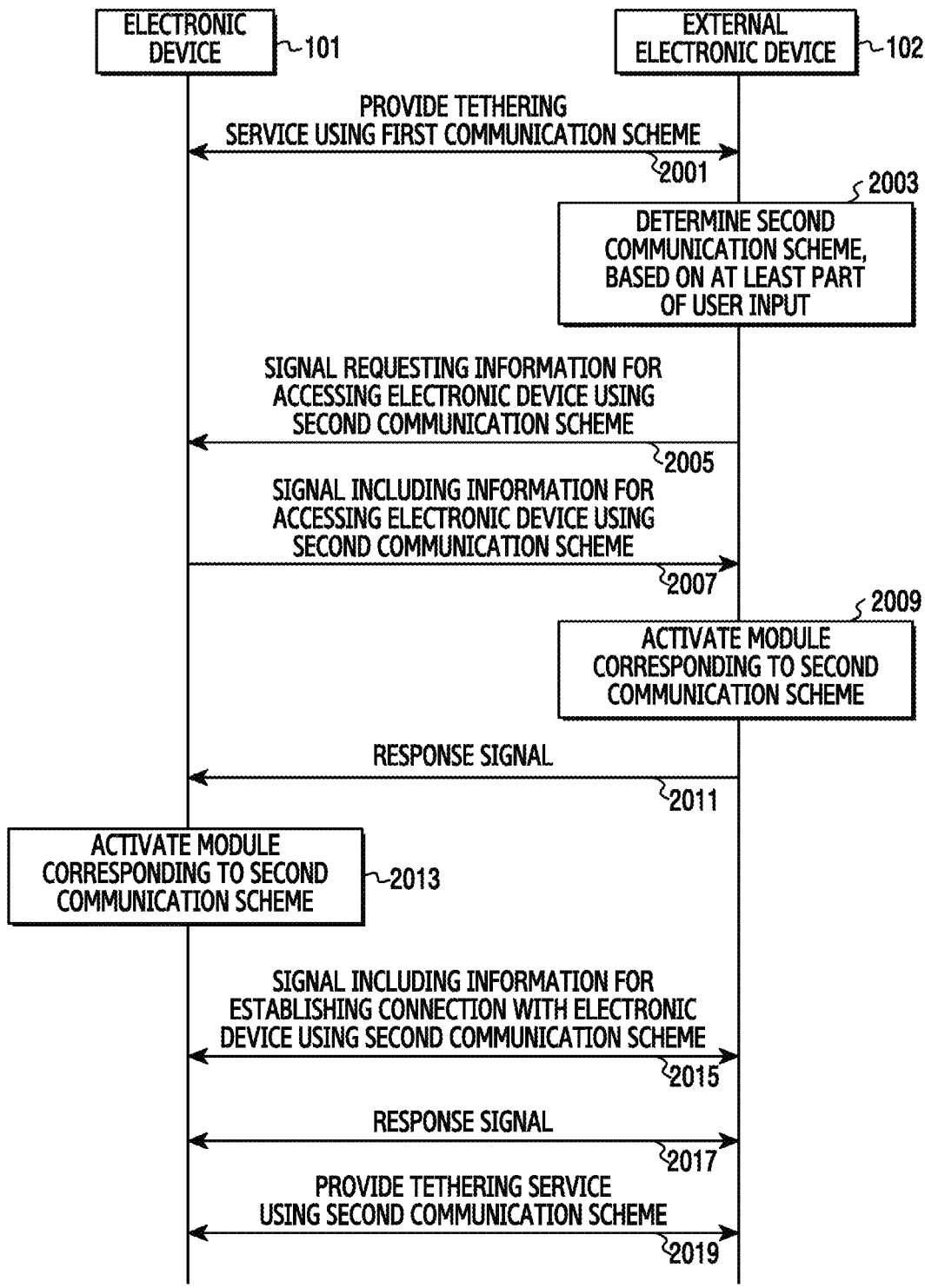
FIG. 20 illustrates a diagram of a method for an external electronic device to change a communication scheme for providing a tethering service, based on a user input according to various embodiments of the present disclosure.

FIG. 20 illustrates a diagram of a method of an external electronic device for changing a communication scheme for providing a tethering service, based on a user input according to various embodiments of the present disclosure.

In operation 2001, the electronic device 101 can provide a tethering service to the external electronic device 102 using a first communication scheme.

In operation 2003, the external electronic device 102 can determine a second communication scheme as the communication scheme for receiving the tethering service, based on at least part of a user input.

In an embodiment, based on at least part of the user input, the external electronic device 102 can display a plurality of communication schemes for receiving the tethering service from the electronic device 101. In response to a received user input which selects the second communication scheme among the displayed communication schemes, the external electronic device 102 can determine the second communication scheme as the communication scheme for receiving the tethering service from the electronic device 101. In an embodiment, the second communication scheme can be the first communication scheme which is currently used to provide the tethering service based on the user input, or a different communication scheme from the first communication scheme.

In operation 2005, the external electronic device 102 can transmit to the electronic device 101 a signal requesting information for accessing the electronic device 101 using the second communication scheme.

In operation 2007, the electronic device 101 can transmit to the external electronic device 102 a signal including information for connecting the external electronic device 102 to the electronic device 101 using the second communication scheme.

In various embodiments, operations 2009 through 2019 are, in at least part, the same as or similar to operations 1213 through 1223 of FIG. 12 and thus their detailed explanations shall be omitted.

FIGS. 21A and 21B are diagrams illustrating a method of an electronic device or an external electronic device for changing a communication scheme for providing a tethering service, based on a user input according to various embodiments of the present disclosure.

In an embodiment, in FIG. 21A, the electronic device 101 or the external electronic device 102 can display an indication 2140 of a current communication scheme (e.g., LTE) of the network 162 and an indication 2130 of a communication scheme (e.g., WiFi) for providing or receiving the tethering service, in a status display region 2120 of a display.

In an embodiment, when receiving a user input for the indication 2130 of the communication scheme for providing or receiving the tethering service, the electronic device 101 or the external electronic device 102 can display information about supported communication schemes for the tethering service as shown in FIG. 21B. For example, based on at least part of the user input for the indication 2130, the electronic device 101 can display information of the communication schemes, such as WiFi, Bluetooth, and USB, for the tethering service, and input fields 2150, 2160, and 2170 for selecting one of the communication schemes for the tethering service. In an embodiment, in response to the user input on the input field 2150 of the WiFi, the electronic device 101 or the external electronic device 102 can determine the WiFi as the communication scheme for the tethering service.

It is noted that the method for selecting the communication scheme for the tethering service is not limited to the embodiment of FIG. 21.

For example, when changing the communication scheme for providing the tethering service to the external electronic device 102 based on at least one of the status of the network 162 and the status of the electronic device 101, the electronic device 101 can display the indication 2130 of the changed communication scheme on the display 160 as shown in FIG. 21A. In an embodiment, when changing the communication scheme for providing the tethering service to the external electronic device 102 based on at least one of the status of the network 162 and the status of the electronic device 101, the electronic device 101 can display an object (or an icon or a user interface) for the user to identify the changed communication scheme. For example, the electronic device 101 can display the object as, but not limited to, a pop-up window, to enable the user to identify the communication scheme.

The method for providing the tethering service and the electronic device supporting the same according to various embodiments of the present disclosure can provide the tethering service by using the communication scheme adaptively determined based on the status of the external network connected to the electronic device.

A method of an electronic device 101 for providing a tethering service to an external electronic device 102 according to various embodiments of the present disclosure can include identifying a status of a network 162 connected to the electronic device 101, determining a communication scheme corresponding to the network status among a plurality of communication schemes which provide a tethering service, broadcasting a signal which includes information for identifying the electronic device 101, using the determined communication scheme, and, based on at least part of a signal received from the external electronic device 102, establishing a connection with the external electronic device 102 for the tethering service.

In various embodiments, the network status can include at least one of a communication type between the electronic device 101 and the network 162, and a channel quality or status between the electronic device 101 and the network 162.

In various embodiments, determining the communication scheme corresponding to the network status can further include determining at least one of a communication type, a communication standard, and an antenna technique between the electronic device 101 and the network 162, corresponding to the network status.

In various embodiments, the method can further include identifying a status of the electronic device 101, wherein determining the communication scheme corresponding to the network status can include determining a communication type corresponding to the network status and the status of the electronic device 101, among the communication schemes which provide the tethering service.

In various embodiments, the status of the electronic device 101 can include at least one of a battery capacity of the electronic device 101, a temperature of the electronic device 101, data charge information, a system load of the electronic device 101, a movement status of the electronic device 101, and a location of the electronic device 101.

In various embodiments, the method can further include receiving a signal including information about a communication scheme supported by the external electronic device 102, from the external electronic device 102, determining a different communication scheme from the determined communication scheme, based on at least part of the communication scheme information supported by the external electronic device 102 and the network status information, and transmitting information of the different communication scheme from the determined communication scheme, to the external electronic device 102.

In various embodiments, the method can further include identifying status change of the network 162 connected to the electronic device 101, and determining a communication scheme corresponding to the changed network status among the communication schemes which provide the tethering service.

In various embodiments, the method can further include identifying status change of the electronic device 101, wherein determining the communication scheme corresponding to the changed network status can include determining a communication scheme corresponding to the changed network status and the changed status of the electronic device 101 among the communication schemes which provide the tethering service.

In various embodiments, the method can further include, in response to a signal, which is received from the external electronic device 102, including information indicating that the external electronic device 102 activates a module for using the communication scheme corresponding to the changed network status, transmitting to the external electronic device 102 a signal including information for connecting the external electronic device 102 to the electronic device 101 using the communication scheme corresponding to the changed network status.

In various embodiments, the method can further include, based on at least part of a user input, changing the network status or determining a communication scheme to provide the tethering service.

A data structure used in the above-stated embodiments of the present disclosure can be recorded on a computer-readable recording medium through various means. The computer-readable recording medium can include storage media such as magnetic storage media (e.g., Read Only Memory (ROM), floppy disk, hard disc, etc.) and optical storage media (e.g., Compact Disk (CD)-ROM, Digital Versatile Disk (DVD), etc.).

While the disclosure has been illustrated and described with reference to certain example embodiments thereof, it will be understood by those skilled in the art that various changes in form and details may be made therein without departing from the spirit and scope of the disclosure as defined by the appended claims and their equivalents.

Although the present disclosure has been described with various embodiments, various changes and modifications may be suggested to one skilled in the art. It is intended that the present disclosure encompass such changes and modifications as fall within the scope of the appended claims.

What is claimed is:

1. An electronic device comprising:
   an antenna;
   a communication circuit electrically connected to the antenna;
   a processor electrically connected to the communication circuit or included in the communication circuit; and
   a memory electrically connected to the processor,
   wherein the memory stores instructions that, when executed, cause the processor:
      to identify a status of a network connected to the electronic device,
      to determine a communication scheme corresponding to the network status among a plurality of communication schemes that provide a tethering service,
      to cause the communication circuit to broadcast a signal comprising information for identifying the electronic device, using the determined communication scheme, and
      to establish, based on at least part of a signal received from an external electronic device, a connection with the external electronic device for the tethering service, wherein the determining a communication scheme includes:
         when the network status is identified as a first network status, a first communication scheme corresponding to the first network status among the plurality of communication schemes is determined, and
         when the network status is identified as a second network status having a higher data rate than the first network status, a second communication scheme corresponding to the second network status among the plurality of communication schemes is determined,
   wherein the instructions, when executed, cause the processor:
      to identify status change of the network connected to the electronic device,
      to determine a communication scheme corresponding to the changed network status among the plurality of communication schemes that provide the tethering service,
      to identify status change of the electronic device,
      to determine a communication scheme corresponding to the changed network status and the changed status of the electronic device among the plurality of communication schemes that provide the tethering service, and
      to cause, in response to a first signal, the communication circuit to transmit to the external electronic device a second signal, wherein:
         the first signal is received from the external electronic device,
         the first signal comprises information indicating that the external electronic device activates a module for using the communication scheme corresponding to the changed network status, and
         the second signal comprises information for connecting the external electronic device to the electronic device using the communication scheme corresponding to the changed network status.

2. The electronic device of claim 1, wherein the network status comprises at least one of (i) a communication type between the electronic device and the network or (ii) a channel quality or status between the electronic device and the network.

3. The electronic device of claim 1, wherein the instructions, when executed, cause the processor to determine, corresponding to the network status, at least one of (i) a communication type, (ii) a communication standard, or (iii) an antenna technique between the electronic device and the network.

4. The electronic device of claim 1, wherein the instructions, when executed, cause the processor:
   to identify a status of the electronic device, and
   to determine, among the plurality of communication schemes that provide the tethering service, a communication type corresponding to the network status and the status of the electronic device.

5. The electronic device of claim 4, wherein the status of the electronic device comprises at least one of a battery capacity of the electronic device, a temperature of the electronic device, data charge information, a system load of the electronic device, a movement status of the electronic device, or a location of the electronic device.

6. The electronic device of claim 1, wherein the instructions, when executed, cause the processor:
   to cause the communication circuit to receive a signal comprising information about a communication scheme supported by the external electronic device, from the external electronic device,
   to determine a different communication scheme from the determined communication scheme, based on at least part of the supported communication scheme information of the external electronic device and a network status information, and
   to cause the communication circuit to transmit information of the different communication scheme from the determined communication scheme, to the external electronic device.

7. The electronic device of claim 1, wherein the instructions, when executed, cause the processor to change, based on at least part of a user input, the network status or to determine a communication scheme for providing the tethering service.

8. A method of an electronic device for providing a tethering service to an external electronic device, comprising:
   identifying a status of a network connected to the electronic device;
   determining a communication scheme corresponding to the network status among a plurality of communication schemes that provide a tethering service;
   broadcasting a signal comprising information for identifying the electronic device, using the determined communication scheme; and
   based on at least part of a signal received from the external electronic device, establishing a connection with the external electronic device for the tethering service,
   wherein the determining a communication scheme includes:

when the network status is identified as a first network status, a first communication scheme corresponding to the first network status among the plurality of communication schemes is determined, and when the network status is identified as a second network status having a higher data rate than the first network status, a second communication scheme corresponding to the second network status among the plurality of communication schemes is determined;

identifying status change of the network connected to the electronic device;

determining a communication scheme corresponding to the changed network status among the plurality of communication schemes that provide the tethering service;

identifying a status change of the electronic device, wherein determining the communication scheme corresponding to the changed network status comprises determining, among the plurality of communication schemes that provide the tethering service, a communication scheme corresponding to the changed network status and the changed status of the electronic device; and transmitting, in response to a first signal, to the external electronic device a second signal, wherein:

the first signal is received from the external electronic device, the first signal comprises information indicating that the external electronic device activates a module for using the communication scheme corresponding to the changed network status, and the second signal comprises information for connecting the external electronic device to the electronic device using the communication scheme corresponding to the changed network status.

9. The method of claim 8, wherein the network status comprises at least one of (i) a communication type between the electronic device and the network or (ii) a channel quality or status between the electronic device and the network.

10. The method of claim 8, wherein determining the communication scheme corresponding to the network status further comprises determining, corresponding to the network status, at least one of (i) a communication type, (ii) a communication standard, or (iii) an antenna technique between the electronic device and the network.

11. The method of claim 8, further comprising identifying a status of the electronic device, wherein determining the communication scheme corresponding to the network status comprises determining, among the plurality of communication schemes that provide the tethering service, a communication type corresponding to the network status and the status of the electronic device.

12. The method of claim 11, wherein the status of the electronic device comprises at least one of a battery capacity of the electronic device, a temperature of the electronic device, data charge information, a system load of the electronic device, a movement status of the electronic device, or a location of the electronic device.

13. The method of claim 8, further comprising:

receiving a signal comprising information about a communication scheme supported by the external electronic device, from the external electronic device;

determining a different communication scheme from the determined communication scheme, based on at least part of the supported communication scheme information supported by the external electronic device and a network status information; and transmitting information of the different communication scheme from the determined communication scheme, to the external electronic device.

14. The method of claim 8, further comprising changing, based on at least part of a user input, the network status or determining a communication scheme to provide the tethering service.

\* \* \* \* \*